United States Patent
Seel et al.

(10) Patent No.: US 10,661,638 B2
(45) Date of Patent: May 26, 2020

(54) SHADE ARRANGEMENT FOR VEHICLE

(71) Applicant: Macauto Industrical Co., Ltd., Tainan (TW)

(72) Inventors: Holger Seel, Wuppertal (DE); Sven-Oliver Seel, Wuppertal (DE)

(73) Assignee: Macauto Industrial Co., Ltd, Yongkang District, Tainan (TW)

( * ) Notice: Subject to any disclaimer, the term of this patent is extended or adjusted under 35 U.S.C. 154(b) by 113 days.

(21) Appl. No.: 15/619,468

(22) Filed: Jun. 10, 2017

(65) Prior Publication Data

US 2017/0368918 A1    Dec. 28, 2017

(30) Foreign Application Priority Data

Jun. 24, 2016  (DE) .................. 10 2016 111 659
Jun. 24, 2016  (DE) .................. 10 2016 111 661

(51) Int. Cl.
*B60J 1/20*   (2006.01)
(52) U.S. Cl.
CPC ........... *B60J 1/2019* (2013.01); *B60J 1/2044* (2013.01); *B60J 1/2047* (2013.01); *B60J 1/2061* (2013.01); *B60J 1/2086* (2013.01)
(58) Field of Classification Search
CPC . B60J 1/20; B60J 1/2019; B60J 1/2044; B60J 1/2047; B60J 1/2061; B60J 1/2086; B60J 1/2013; B60J 1/2022; B60J 1/2063; B60J 1/2083; B60J 3/02

See application file for complete search history.

(56) References Cited

U.S. PATENT DOCUMENTS

| | | | | |
|---|---|---|---|---|
| 6,347,825 B2* | 2/2002 | Seel | ...................... | B60J 1/2027 160/370.22 |
| 6,910,518 B2* | 6/2005 | Zimmermann | ........ | B60J 1/2019 160/370.21 |
| 7,896,058 B2* | 3/2011 | Hansen | .................. | B60J 1/2033 160/265 |
| 8,104,822 B2* | 1/2012 | Kriese | .................... | B60J 1/2086 160/370.21 |
| 9,132,718 B2* | 9/2015 | Starzmann | ............. | B60J 1/2022 |
| 2001/0022218 A1* | 9/2001 | Schlecht | ................ | B60J 1/2022 160/370.22 |

(Continued)

FOREIGN PATENT DOCUMENTS

| | | | | |
|---|---|---|---|---|
| CN | 101302917 A | 11/2008 | ............... | E06B 9/40 |
| CN | 202573731 U | 12/2012 | ................ | B60J 1/20 |

(Continued)

*Primary Examiner* — Beth A Stephan
(74) *Attorney, Agent, or Firm* — Von Rohrscheidt Patents

(57) ABSTRACT

A shade arrangement for vehicles, in particular for a side window of a car door, the shade arrangement including a roll up blind web that is movable from a pulled in position into a shading pulled out position; a winding shaft at which the roll up blind web is attached with a first edge; a pull out profile at which the roll up blind web is attached with a second edge; a first drive which actuates the winding shaft for rolling up the roll up blind web; a lifting rod which is removably attachable at the pull out profile; a second drive through which the lifting rod arranged at the pull out profile moves the roll up blind web by a linear movement between the pulled in position and the pulled out position.

10 Claims, 14 Drawing Sheets

(56) References Cited

U.S. PATENT DOCUMENTS

| | | | |
|---|---|---|---|
| 2008/0017335 A1* | 1/2008 | Pohl | B60J 1/17 160/370.22 |
| 2008/0216972 A1* | 9/2008 | Starzmann | B60J 1/2086 160/310 |
| 2009/0020236 A1* | 1/2009 | Hansen | B60J 1/2033 160/275 |
| 2009/0078379 A1* | 3/2009 | Hansen | B60J 1/2033 160/265 |
| 2012/0049564 A1* | 3/2012 | Haase | B60J 1/2041 296/97.8 |
| 2012/0186759 A1* | 7/2012 | Lin | B60J 1/2022 160/370.22 |
| 2012/0205058 A1* | 8/2012 | Lin | B60J 1/2022 160/370.22 |
| 2013/0020040 A1* | 1/2013 | Lin | B60J 1/2022 160/370.22 |
| 2015/0001879 A1* | 1/2015 | Starzmann | B60J 1/2022 296/152 |
| 2015/0027646 A1* | 1/2015 | Lin | B60J 1/12 160/370.22 |
| 2016/0096417 A1* | 4/2016 | Lee | B60J 1/2063 160/239 |
| 2017/0136855 A1* | 5/2017 | Yasuda | B60J 1/2013 |

FOREIGN PATENT DOCUMENTS

| | | | | |
|---|---|---|---|---|
| CN | 203902219 U | 10/2014 | | B60J 1/20 |
| CN | 104369644 A | 2/2015 | | B06J 3/02 |
| DE | 102008063775 A1 | 7/2010 | | |
| DE | 202011103679 U1 | 1/2012 | | |
| DE | 202011103679 U1 | 3/2012 | | E06B 9/56 |
| DE | 102011006994 A1 | 4/2012 | | E06B 9/58 |
| DE | 102011008994 A1 | 4/2012 | | |
| DE | 102014211617 A1 | 12/2014 | | |
| DE | 102014211619 A1 | 12/2014 | | |
| DE | 102013016047 A1 | 4/2015 | | |
| EP | 196740 A2 | 10/1986 | | |
| EP | 1123824 A2 | 8/2001 | | B60J 1/20 |
| KR | 101601497 B1 | 3/2016 | | B60J 3/00 |
| TW | 201336706 A | 9/2013 | | B60J 1/20 |

* cited by examiner

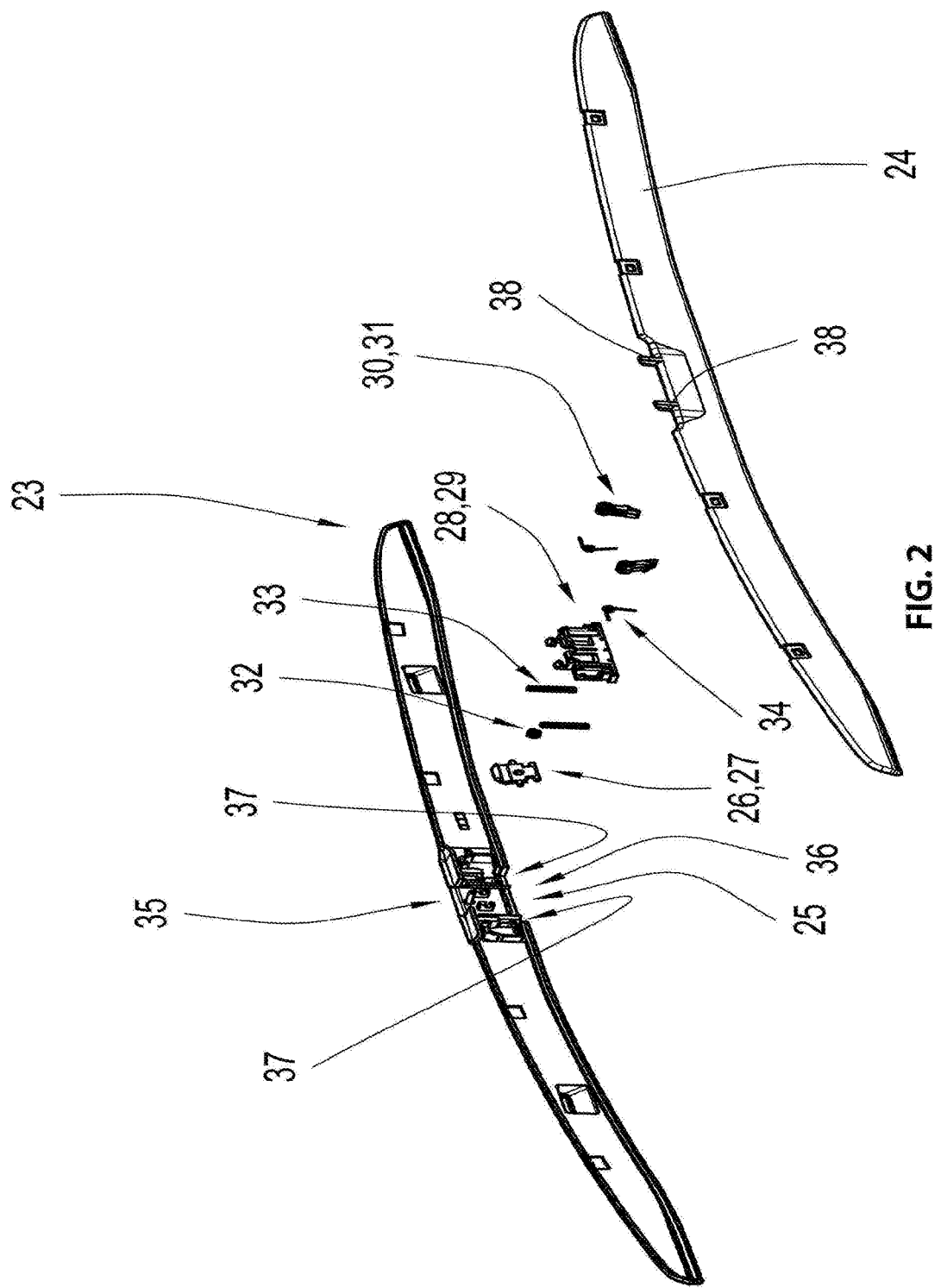

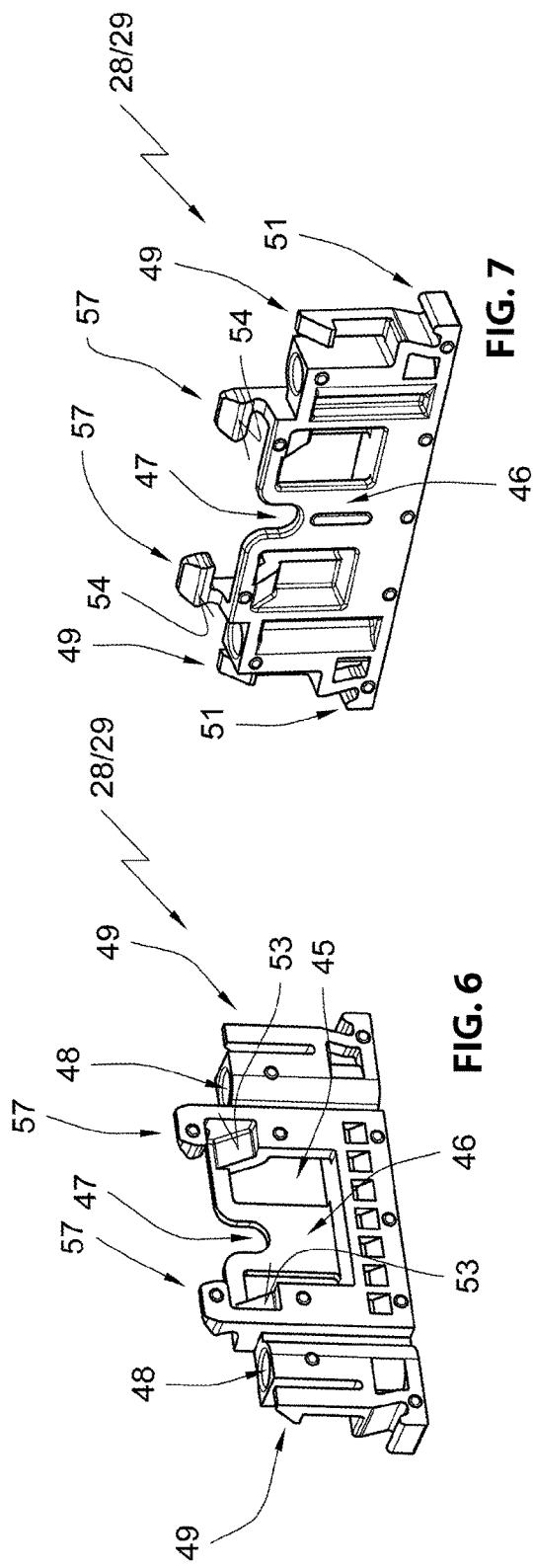

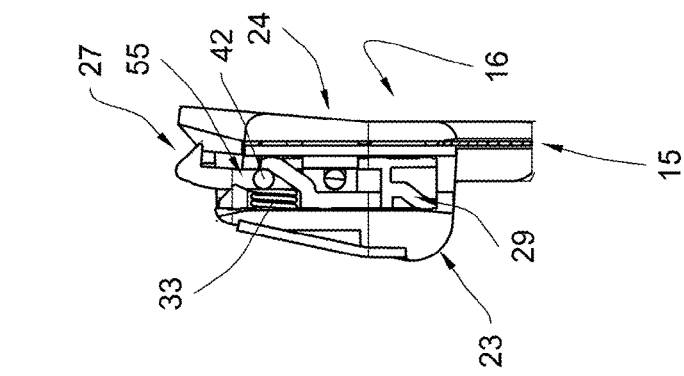
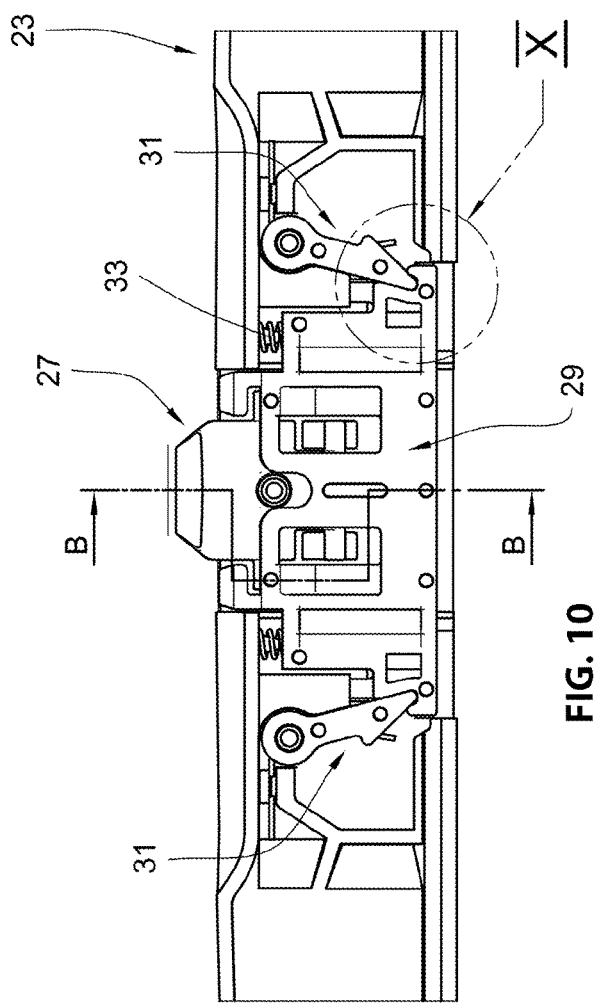
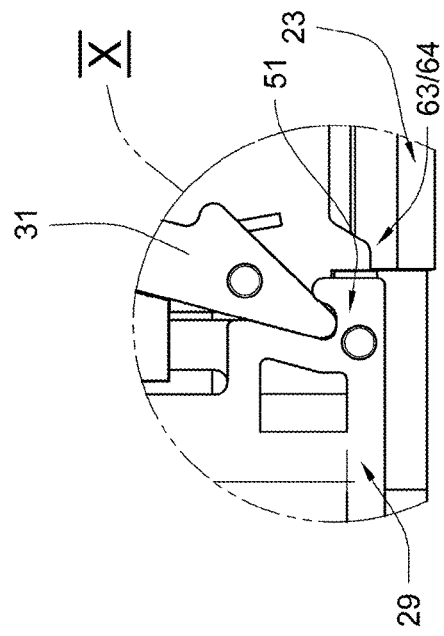

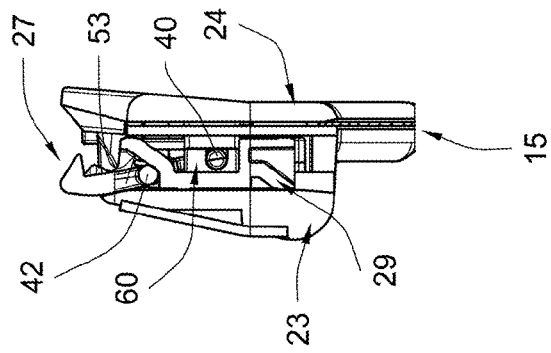
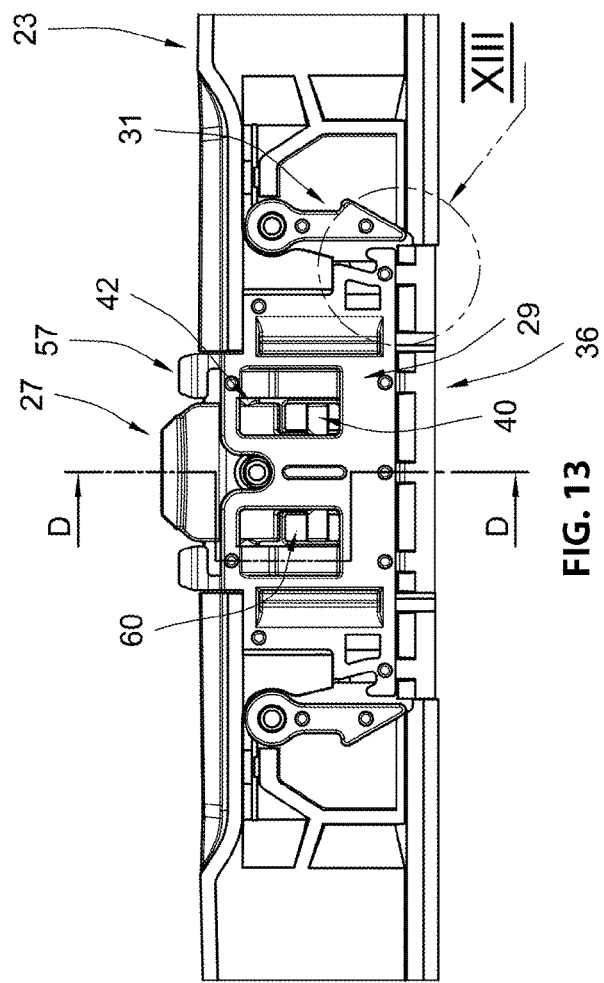
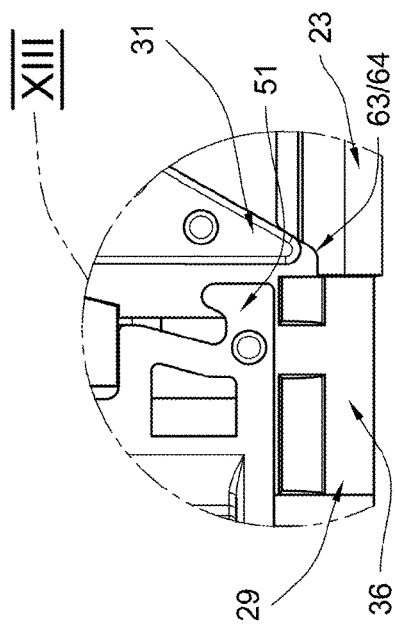

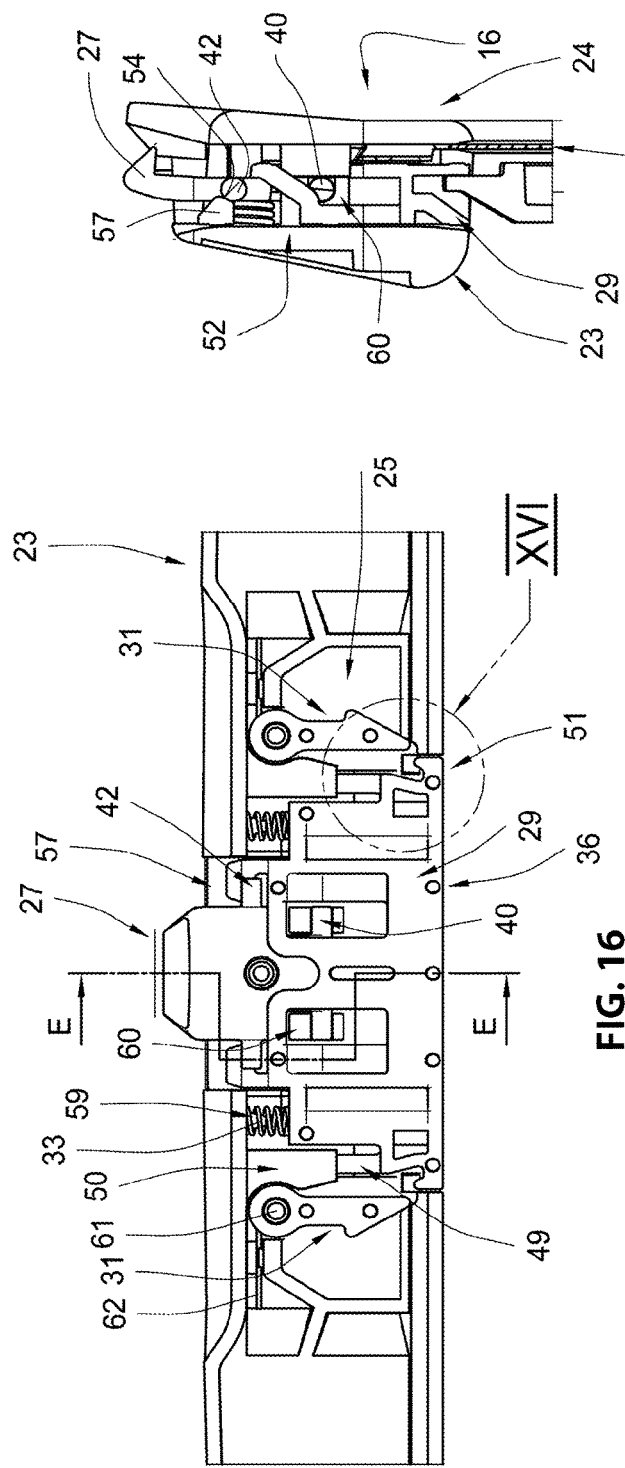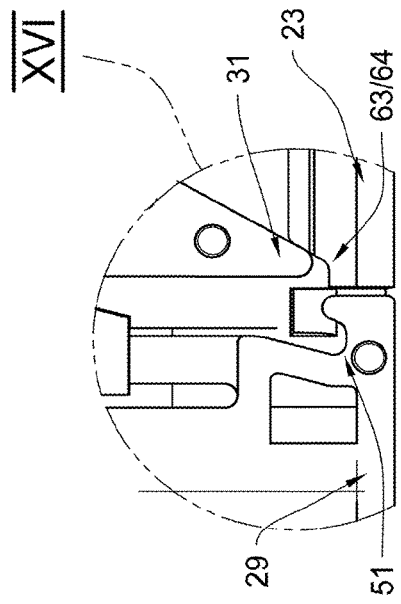

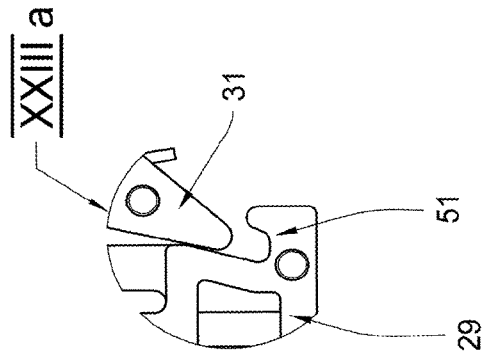
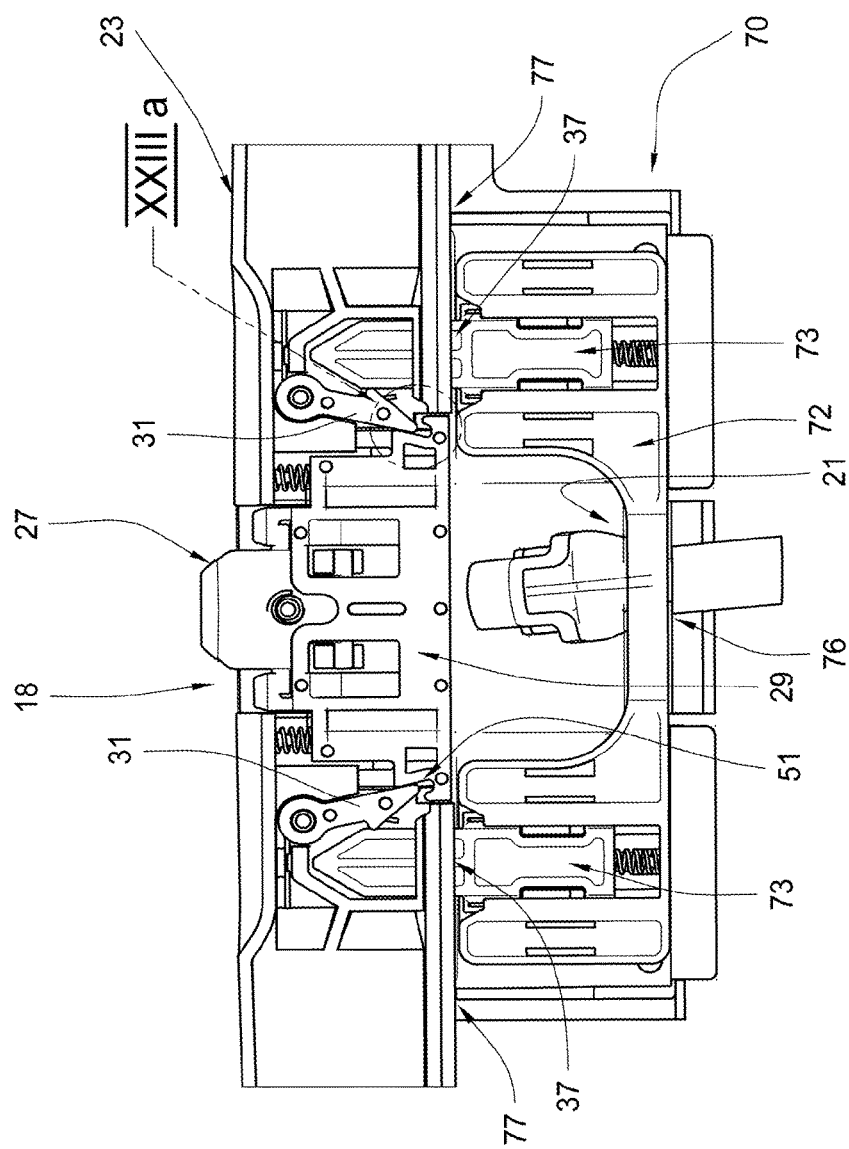
FIG. 23 B
FIG. 23 A

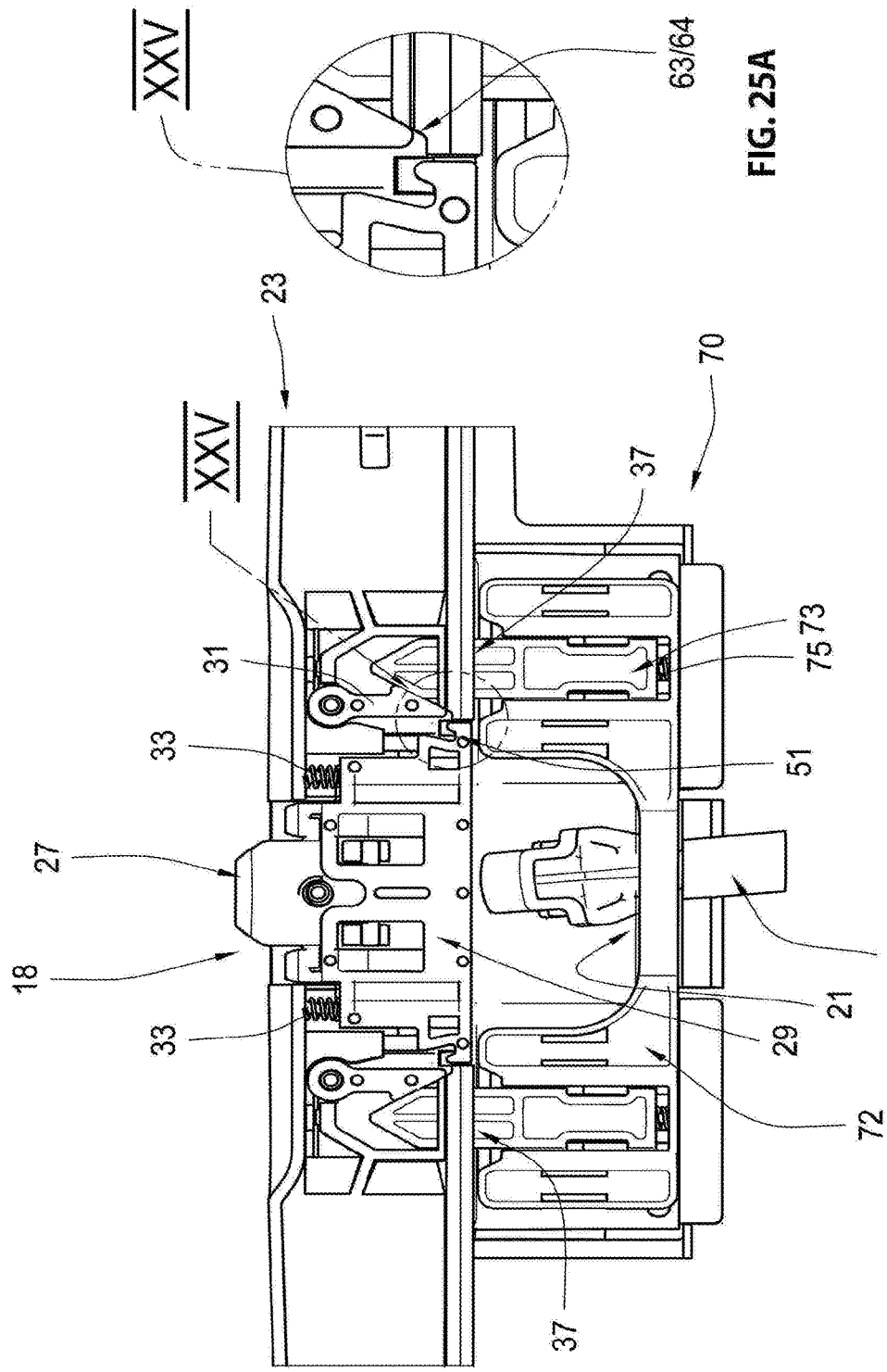

SHADE ARRANGEMENT FOR VEHICLE

RELATED APPLICATIONS

This application claims priority from and incorporates by reference German Patent Applications DE 10 2016 111 659.9 filed on Jun. 24, 2016; and DE 10 2016 111 661.0 filed on Jun. 24, 2016.

FIELD OF THE INVENTION

The invention relates to a shade arrangement for vehicles, in particular for a side window of a car door.

BACKGROUND OF THE INVENTION

It is well known to configure cars with shade arrangements in order to minimize sun radiation heating up an interior and causing glare and on the other hand side to prevent passersby from looking into the interior. It is known from is size adapted to requirements of the drive rope.

It is known from EP 196 740 A2 to move sun roll up blinds back and forth between a pulled out shading position and a pulled in position by an electric motor drive. For this purpose a pull out profile of the sun roll up blind is connected with a lifting rod which is retracted and extended by an electric motor drive and the sun roll up blind is thus moved back and forth between the pulled in position and the pulled out position.

A lifting rod that is attached at the pull out profile in a non-disengageable manner is typically considered problematic for optical reasons but also in order to protect vehicle passengers in case of an accident. Thus, applicant proposes a sun roll up blind in DE 10 2013 016 047 A1 wherein the sun roll up blind is moved into the shading position by a lifting rod and supported at the vehicle in this position so that the lifting rod that is disengageably attached at the pull out profile can be moved back into its pulled in position that is covered by the door fairing.

DE10 2008 063 775 A1 proposes to provide a receiver for the lifting rod in the pull out profile. The lifting rod is disengageably supported in the receiver. Furthermore the pull out profile includes an interlocking arrangement. The interlocking arrangement can be attached at the vehicle. When extending the lifting rod the lifting rod is interlocked in the receiver of the pull out profile wherein the interlocking of the lifting rod in the pull out profile is disengaged as soon as the interlocking arrangement of the pull out profile is attached at the vehicle. Then the lifting rod can be moved into its covered pulled out position. In order to move the sun blind back from the shading position into its pulled in position the lifting rod is moved back in a direction towards the pull out profile. As soon as the lifting rod sits in the receiver it is interlocked therein. This interlocking leads to an unlocking of the interlocking arrangement of the pull out profile so that the pull out profile is moved back into its pulled in position by returning the rod. DE 10 2008 063 775 A1 describes a mechanical embodiment configured as push interlocking according to the ball pen principle. It is alternatively described that the interlocking between the lifting rod and between the pull out profile and a vehicle side support arrangement can also be performed by an electromagnet.

DE 10 2014 211 617 A1 and DE 10 2014 211 619 A1 are connected with one another by inner priority and disclose various embodiments of sun roll up blinds according to the invention. Multiple embodiments show locking arrangements arranged at the pull out profile that unlock or lock the sun roll up blind through the lifting rod in the shading position in a vehicle side support arrangement. In addition to mechanical interlocking electromagnetic interlocking, hydraulic interlocking or pneumatic interlocking is proposed. Various shapes of interlocking bars and interlocking pins are disclosed which are partially urged into the interlocked position by spring loading and which are unlocked by the lifting rod. In some embodiments the lifting rod is rotated about its longitudinal axis in order to impart a control function upon the interlocking arrangement.

BRIEF SUMMARY OF THE INVENTION

Thus, it is an object of the invention to configure the pull out profile aesthetically appealing and compact while providing a reliably operating locking arrangement for fixating the pull out profile in the shade position.

The object of the invention is achieved by a shade arrangement for vehicles, in particular for a side window of a car door, the shade arrangement including a roll up blind web that is movable from a pulled in position into a shading pulled out position; a winding shaft at which the roll up blind web is attached with a first edge; a pull out profile at which the roll up blind web is attached with a second edge; a first drive which actuates the winding shaft for rolling up the roll up blind web; a lifting rod which is removably attachable at the pull out profile; a second drive through which the lifting rod arranged at the pull out profile moves the roll up blind web by a linear movement between the pulled in position and the pulled out position; a locking arrangement that is arranged in the pull out profile wherein the locking arrangement is configured to attach the pull out profile in a support arrangement at the vehicle; a control arrangement which cooperates with the locking arrangement and with the lifting rod to unlock or to lock the locking arrangement in the pulled out position of the roll up blind web, characterized in that the pull out profile forms a receiving chamber in which a control arrangement is arranged in addition to the locking arrangement, wherein the control arrangement is configured to influence a position of the locking arrangement.

Configuring a receiving chamber in which the locking arrangement and the control arrangement are arranged facilitates arranging both of them in a space in the pull out profile that is substantially optically closed. The spatial arrangement of the locking arrangement and the control arrangement in direct proximity to the same receiving chamber provides for a reliable and error free interaction of both components.

It is furthermore provided that the control device is supported movable in a linear manner within the receiving chamber between a first end position and a second end position in order to assume control positions.

By assuming control position through linear movement it is provided that the movement space for the control arrangement can be kept small, in particular when the control positions are exclusively reachable by linear movements of the control arrangement.

It is initially provided that a first control position is assumed in the first end position and a second control position is assumed in the second end position.

However it is advantageous when it is additionally provided that the control arrangement includes three control positions, wherein the third control position is assumed in a defined intermediary position between the end positions.

In order to assume the first control position or the second control position there is a defined position of the control arrangement by moving into the first end position or the second end position.

In order to also be able to define the third control position it is provided that at least one arresting element is arranged within the receiving chamber wherein the at least one arresting element retains the control arrangement in the defined third intermediary position.

It is furthermore provided that the interlocking arrangement includes a locking bar and a locking bar spring that loads the locking bar with a force in the locking direction.

By loading the locking bar of the locking arrangement with the locking bar spring it is assured that the locking bar element assumes a defined idle position. For the invention the locking bar position was selected as the defined position, wherein also the open position could be used as a matter of principle as the locking bar position in the idle condition. It is an essential advantage that after a corresponding control of the locking bar the locking bar pivots back into its defined starting position and is typically controllable as a portion of the entire system always from the same defined idle position.

It is furthermore provided that the control device is supported in an end position by a control spring.

It also holds for the control arrangement that the control arrangement is always arranged in the same defined end position in its idle position by using the control spring. Thus when influencing the control device by the lift rod this defined position of the control arrangement can be used as a base line as a matter of principle.

It is furthermore provided that the arresting element is loaded by an arresting spring.

The recited advantages also apply for arresting elements that are loaded by an arresting spring. Since the arresting element are also required for controlling the entire system it is very advantageous for controlling the arresting springs when the arresting springs are controllable from a defined position. Advantageously the arresting elements are supported by the arresting spring in a displaced position. Thus, however it is also conceivable that the arresting elements are supported by the arresting spring in a displaced arresting position.

It is furthermore provided that the control device forms a receiver for the lifting rod so that the lifting rod can engage the control arrangement in a simple manner in order to perform locking and unlocking.

BRIEF DESCRIPTION OF THE DRAWINGS

Further advantages and an improved comprehension can be derived from the subsequent description of an embodiment with reference to drawing figures, wherein:

FIG. 2 illustrates an exploded view of a pull out profile of a shade arrangement according to the invention;

FIG. 6 illustrates a perspective view of a front side of the control arrangement of the shade arrangement;

FIG. 7 illustrates an perspective view of a back side of the control arrangement according to FIG. 6;

FIG. 8 illustrates a front view of the control arrangement according to FIG. 6;

FIG. 9 illustrates a sectional view of the control arrangement according to the sectional line A-A in FIG. 8;

FIG. 10 illustrates a partial view of the pull out profile with a view into the locking arrangement, control arrangement in an intermediate position;

FIG. 11 illustrates a detail view according to the detail circle X in FIG. 10;

FIG. 12 illustrates a sectional view according to the sectional line B-B in FIG. 10;

FIG. 13 illustrates the representation according to FIG. 10 with the control arrangement in the upper end position;

FIG. 14 illustrates an enlarged detail view according to the detail circle XIII in FIG. 13;

FIG. 15 illustrates a sectional view according to the section line D-D in FIG. 13;

FIG. 16 illustrates the representation according to FIG. 10 with the control arrangement in a lower end position;

FIG. 17 illustrates the detail enlargement according to the detail circle XVI in FIG. 16;

FIG. 18 illustrates the sectional view according to sectional line E-E in FIG. 16;

FIGS. 23A-23C, 24, 24A, 25, 25A, 26, 26A illustrate a cooperation of the switching arrangement and locking arrangement as a function of different positions of the control arrangement.

DETAILED DESCRIPTION OF THE INVENTION

Figure 1:
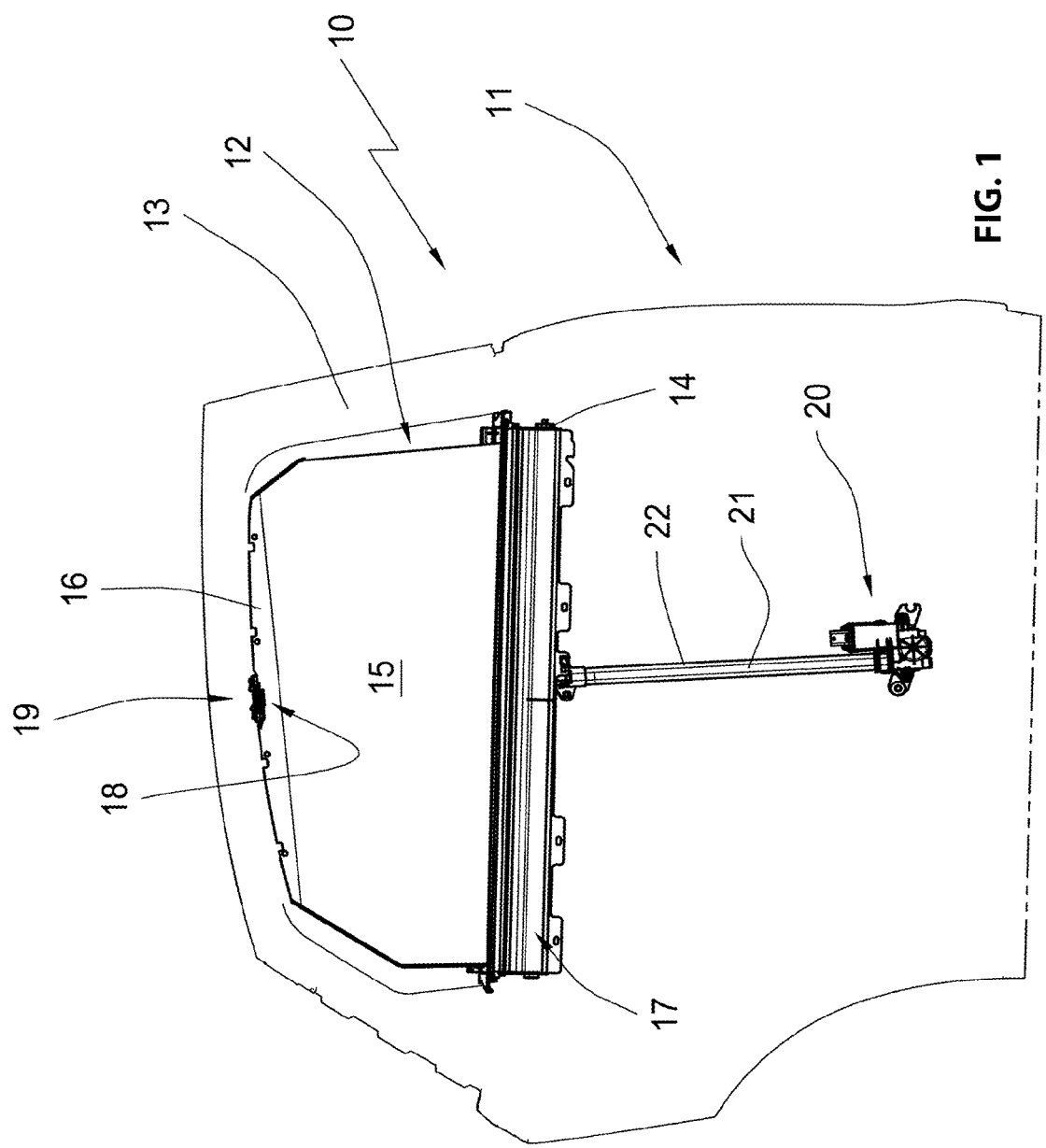
FIG. 1 illustrates a schematic view of an installed condition of a shade arrangement according to the invention in a side door of a vehicle.

The shade arrangement according to the invention is designated overall with the reference numeral 10 in the drawing figures.

FIG. 1 illustrates a typical but not the only installation situation of the shade arrangement 10. A side door 11 of a vehicle is illustrated wherein the side door is provided with a window cut out 12. The window cut out 12 is defined by a window frame 13.

The shade arrangement 10 is arranged at the side door 11. The shade arrangement 10 includes a roll up blind web 15 that is pullable from a winding shaft 14 wherein the roll up blind 15 includes a so called pull out profile 16 at an edge that is oriented away from the winding shaft 14. The winding shaft 14 is supported in a winding shaft housing 17 and provided with a first drive that is not illustrated herein. This drive typically is a wind up spring motor.

The roll up shade web 15 is pullable from a pulled in position in which it is wound onto the winding shaft 14 to a pulled out or shade position from the winding shaft 14. In the pulled out or shade position as illustrated e.g. in FIG. 1 the roll up blind web covers the window cut out 12 at least substantially. Therefore the vehicle interior is at least partially protected against sun radiation or from view of passersby depending on a configuration of the roll up blind 15.

The pull out profile 16 supports an interlocking arrangement 18, the side door 11 supports a support arrangement 19 in a portion of the window frame 13, wherein the roll up blind 15 can be fixated in the support arrangement 19 in a shade position of the roll up web 15.

It is conceivable as a matter of principle that the roll up blind 15 is moved manually from its pulled in position into its pulled out position and when required back again into the pulled in position which is well known from simple shade arrangements 10. The invention, however, relates to a shade arrangement 10 which is moved back and forth between the pulled in position and the shade position by a motor drive. For this purpose the shade arrangement includes a second, advantageously electric motor drive which impacts a lifting rod 21. The lifting rod 21 is movably supported in a support tube 22 in a linear manner for protection and if required also for support. In order to distort an optical appearance as little as possible a lifting rod 21 is typically supported on a side of the roll up blind web 15 that is oriented away from a passenger transported in the interior thus on the outside.

Operating the shade arrangement 10 according to FIG. 1 is performed as follows.

The roll up web 15 is rolled onto the winding shaft 14 in its pulled in position so that its pull out profile 16 is supported at the lower window edge within a cutout of the door fairing. The electric drive motor 20 is driven by a corresponding operating element and moves the lifting rod 21 upward in a linear manner which is coupled with the pull out profile 16. Thus, the pull out profile 16 is moved in a direction towards an upper window edge. The roll up blind web that is attached at the pull out profile 16 follows. The locking arrangement 18 of the pull out profile 16 engages the support arrangement 19 of the window frame 13 and fixates the roll up blind web 15 in its shade position. The lifting rod 21 is disengaged from the pull out profile and moved downward by the electric motor 20 until it reaches its starting position. In the starting position the lifting rod 21 is hidden in the support tube 22 behind the door fairing and is thus hidden in the support tube 22 behind the door fairing and is thus arranged outside of the window cut out 12.

In order to move the roll up blind 15 back into its pulled in position the lifting rod 21 is initially moved upward by the electric motor 20 through a switch impulse until the lifting rod couples with the pull out profile 16. The locking arrangement 18 is disengaged by the support arrangement 19. The lifting rod 21 is moved downward in a direction towards the roll up web 15.

The first drive, the wind up shaft drive loads the wind up shaft 14 with a force that is oriented against the pull out direction. Therefore the wind up shaft drive provides that the roll up blind web is wound onto the winding shaft 14 when the lifting rod 21 with the coupled pull out profile 16 is moved downward.

In the prior art recited supra many options are described how the wind up shaft 21 impacts the locking arrangement 18 in order to lock or unlock the locking arrangement 18 with the support arrangement 19 depending whether the pull out profile shall be arranged at the upper window frame in the shading position or disengaged therefrom. It is subsequently described which components and functions the shade arrangement 10 has in detail.

FIG. 2 illustrates an exploded view of the pull out profile 16 of the shade arrangement according to the invention. The pull out profile 16 includes a first profile rail 23 and a second profile rail 24. These are also designated as outer profile rail 23 and inner profile rail 24, wherein the outer profile rail 23 is arranged proximal to the window and the inner profile rail 24 is arranged proximal to the interior. The mutual arrangement plane of the profile rails 23, 24 is arranged parallel to the roll up shade web. The two profile rails 23, 24 together forming the pull out profile 16 form a receiving chamber 25 between each other.

The receiving chamber 25 receives the locking arrangement which is overall designated with the reference numeral 18 wherein the locking arrangement includes a locking bar element 26 configured as a pivotable locking bar 27. Additionally a control arrangement 28 configured as a switching block 29 is arranged in the receiving chamber as well as two arresting elements 30 configured as locking catches 31. A locking bar spring 32 is associated with the locking bar element 26, two control springs 33 are associated with the control arrangement 28 and an arresting spring 34 is associated with each arresting element 30, wherein the locking bar spring 32 and the control spring 33 are configured as coil springs and the arresting spring 34 is configured as an leg spring.

The springs 32, 33, 34 are used for supporting the locking bar element, the control arrangement 28 or the arresting element 30 in a defined terminal movement position.

The receiving chamber 25 forms plural openings. The first opening is the locking bar opening 35 from which the pivotable locking bar 27 protrudes in sections. The second opening is a lifting rod opening 36 through which the lifting rod 21 can penetrate into the receiving chamber. The bar opening 35 is arranged at a top side of the pull out profile 16. The lifting rod opening 36 is arranged at a bottom side of the pull out profile 16. In the instant embodiment the openings 35 and 36 are arranged opposite to each other. Last not least a respective switch opening 37 is arranged on a right side and on a left side adjacent to the lifting rod opening 36, wherein the switching opening 37 is also accessible from a bottom side of the pull out profile 16.

The inner profile rail 24 includes two upward oriented centering pins 38 that are offset from each other and which cooperate with centering openings on a side of the support arrangement 19 in order to align the locking arrangement 18 correctly with the support arrangement 19.

The profile rails 23 and 24 receive the recited components of the locking arrangement 18 and the upper edge of the roll up web 15 between each other so that the locking arrangement 18 and the control arrangement 28 with all their components are arranged in the receiving chamber 25 of the pull out profile 16.

Figure 5:
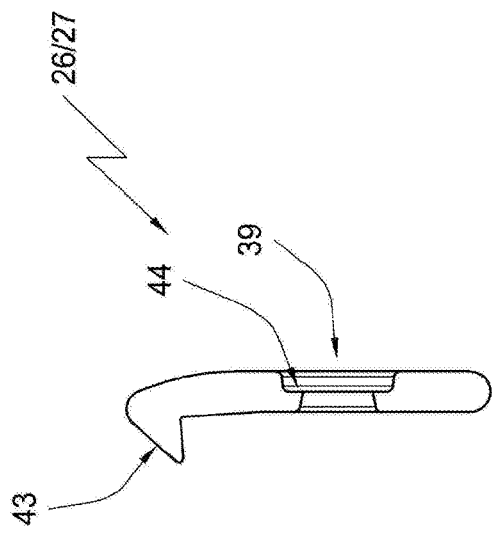
FIG. 5 illustrates a sectional view of the locking element according to the sectional line C-C in FIG. 3.
Figure 3:
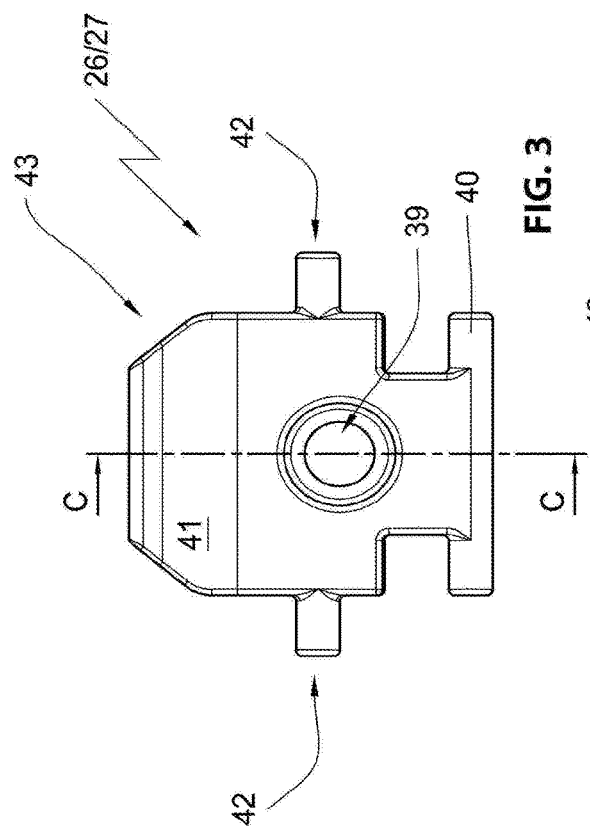
FIG. 3 illustrates a view of a locking element of the shade arrangement according to the invention on a back side of the shade arrangement.
Figure 4:
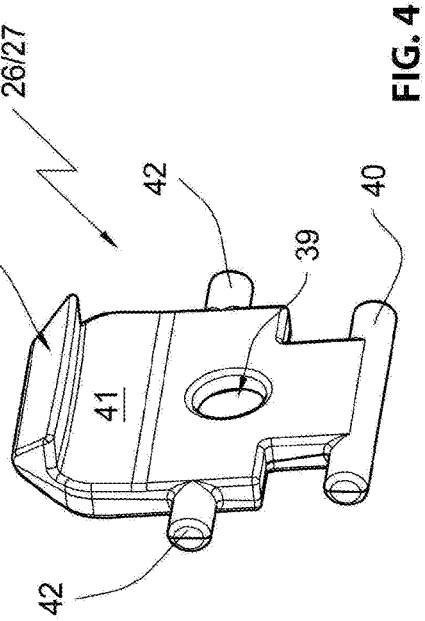
FIG. 4 illustrates perspective view of the locking element illustrated in FIG. 3 in a view showing the front side.

The locking bar element 26 configured as the pivotable locking bar 27 is illustrated in FIGS. 3-5. FIG. 3 illustrates a view of the backside of the pivotable locking bar 27 which is provided with a cut out 39 that is visible quite well. Below the cut out 39 there is a locking bar axis 40. On a right side and on a left side adjacent to the recess 39 a respective control pin 40 extends from the body 41 of the pivotable locking bar 27. The control pins 42 are oriented parallel to the locking bar axis 40.

The pivotable locking bar 27 forms the locking bar lug 43 at an end that is opposite to the locking bar axis 40 wherein the locking bar lug 43 penetrates into the paper plane with respect to FIG. 3. The locking bar lug 43 is visible quite well in the perspective view of the pivotable locking bar 27 according to FIG. 4.

The sectional view of FIG. 5 according to the sectional lines C-C in FIG. 3 illustrates however that the cut out 39 forms a shoulder 44 which is annular.

The pivotable locking bar 27 is arranged in the receiving chamber of the pull out profile 16 so that it is pivotable about the locking bar axis 40. The locking bar lug 43 cooperates with the support arrangement 19 at the vehicle to fixate the pull out profile 16 at this location. The control pins 42 facilitate influencing the pivot movement of the pivotable locking bar 27 through the control arrangement 28 configured as switching block 29. The annular step 44 forms a reactive bearing for the locking bar spring 32 inserted therein. The cut out 39 itself receives a support pin of the locking bar spring 32.

The control arrangement 28 configured as a switching block 29 is illustrated in FIGS. 6-9 in various embodiments.

The control arrangement 28 or the switching block 29 form a locking bar cavity. The pivoting locking bar 27 is arranged in this locking bar cavity 45. The rear wall 46 of the locking bar space 45 forms a locking bar spring pull in 47 and two cut outs.

A respective control spring receiving cavity 48 is arranged on a right side and on a left side of the locking bar cavity 45 wherein the control springs 33 are inserted into the control spring receiving chamber 48. A respective support hook 49 is arranged laterally from each control bar receiving chamber 48. The support hooks 49 cooperate with support protrusions 50 at a profile 23, 24 to support the switching block 29 in the receiving chamber 25 of the pull out profile. More details with this respect are provided infra. The switching block 29 thus respectively forms an arresting seat 51 laterally from each support hook 49, wherein the arresting seat cooperates with the arresting elements 30 configured as locking catches 31. Looking at the front view of the switching block 29 in FIG. 8 from left to right yields the following configuration.

The outer arresting seat 51 is followed by a retaining hook 49 next to which a control spring receiving chamber 48 is arranged. Thereafter comes the locking bar cavity 45 which forms the locking bar spring pull in 47 in the portion of a vertical center axis. The switching block 29 is mirrored along the vertical center axis so that a control spring receiving chamber 48, a support hook 49 and another arresting seat 51 is arranged in sequence on a right side of the locking bar cavity 45.

The switching block 29 forms two control coulisses that are overall designated with the reference numeral 52 which respectively cooperate with a control pinion 42 of the pivotable locking bar 27. The control coulisse 52 is visible best in its entirety from FIG. 9 which illustrates a sectional view along the sectional line A-A in FIG. 8. Furthermore portions of the control coulisse 52 can also be derived from FIGS. 6-8. The control coulisse 52 is described as follows.

The control coulisse 52 is made from a lifting surface 53 that is inclined in a slant angle relative to the linear movement of the lifting rod 21 and a locking surface 54 which are offset from a movement cavity 55 that is kept without control surfaces. In a movement direction of the lifting rod 21 towards a shaped position the movement cavity 55 follows upon the bottom lifting surface 53. Above the movement cavity 55 there is the locking surface 54 which is in turn configured by locking blocks 57.

Last not least in can be derived from FIG. 9 that the control arrangement 28 forms a lifting rod receiver 58 at a bottom side oriented towards the lifting rod 21 wherein the lifting rod is configured to engage the lifting rod receiver in order to move the roll up shade web 15 up and down.

For the function of the invention the control arrangement 28 configured as switching block 29 forms a central component. However, an abstract application of the scope and spirit of the invention also facilitates deviating from the actual configuration of the described switching block 29. The control arrangement 28, however, does not require the described control coulisse 52 in any case with its bottom up configuration including the lift out surfaces 53, the movement cavity 55 and the control surfaces 54. Also a reaction bearing for the control spring 33 and at least one arresting seat 51 is required. This becomes evident from the function of the invention that will be described infra.

FIGS. 10, 13 and 16 respectively illustrate a section of the first profile rail 23 forming the receiving chamber 25 of the pull out profile 16. In the receiving chamber 25 the essential components are inserted that form the locking arrangement 18. The essential difference between the recited figures is in the position of the control arrangement 18 and its respective cooperation with the locking bar element 26 and the arresting elements 30. In order to illustrate the cooperation of the individual components of the locking arrangement 18 detail enlargements and sectional views are illustrated for the respective main FIGS. 10, 13 and 16.

As stated supra the invention is described with reference to a shade arrangement 10 for a car door 11 and therein in particular in combination with a window cut out 12 that is to be shaded. This has the effect that the linear movement of the lifting rod 21 is oriented upward so that the roll up blind web 15 is moved into a shading position by engagement at the pull out profile 16. The linear movement of the lifting rod 21 is oriented downward in order to move the lifting rod 21 back and to move the roll up blind web 15 from its shading position or pull out position back into a pulled in position that is rolled up on the winding shaft 14. The terms up and down already used supra and used more infra therefore relate to the linear movement of the lifting rod 21 and to the pulled out or shading position and the pulled in position of the roll up shade web 15.

In FIG. 16 the switching block 29, the pivoting locking bar 27 and two locking catches 31 are inserted into the receiving chamber 25 of the first profile rail 23. The first profile rail 23 forms the support protrusions 50 to anchor the switching block 29 wherein the support protrusions 50 are being reached behind by the retaining hooks 49. The control springs 23 are inserted into the respectively associated control spring receiving chamber and are supported on the one hand side at the base of the control spring receiving chamber 48 and at a reaction bearing surface of the profile rail 23. At this location they are supported by a support mandrel 59.

The switching block 29 is inserted with its bottom side in the lifting rod opening 36 of the profile rail 23 and is supported movable in a linear manner within the receiving chamber 25 between a lower end position (illustrated in FIG. 16) and an upper end position (illustrated in FIG. 13). Furthermore an intermediary position (FIG. 10) between the end positions can be assumed.

The pivotable locking bar 27 is arranged in the locking bar space 45 of switching block 29. Its locking bar axis 40 is supported in bearing shells 60 which are formed by the profile rail 23. The locking bar axis 40 is oriented parallel to the longitudinal extension of the pull out profile 16 which means in the embodiment that the locking bar axis 40 is oriented parallel to a movement direction of the vehicle. The pivot movement thus extends transversal to a longitudinal extension of the pull out profile 16. The locking bar spring 32 that is arranged between the locking bar 27 and the profile rail 23 presses the pivotable locking bar 27 into its locking position, in the particular embodiment of FIGS. 10, 13 and 16 towards the viewer. The control pinions 32 are respectively arranged in the associated control coulisse 52 of the switching block 29.

The arresting elements 30 configured as locking catches 31 are supported on a support mandrel 61 formed by the profile rail 23 wherein the support mandrel simultaneously defines the physical pivot axis of the locking catches 31. A pivot plane of the locking catches 31 is oriented parallel to a separation plane of the profile rails 23 and 24. The arresting springs 34 configured as leg springs are arranged between the profile rail 23 and the respective locking catch 31. As part of the leg springs only the leg spring arm 62 that is anchored in the profile rail 23 is visible in FIGS. 10, 13 and 16. The arresting springs 34 support the locking catches 31 in a disengaged position that is removed from the switching block 29, in particular the arresting seat 51. This is illustrated in FIG. 16. This displaced position is illustrated in detail in FIG. 17 which is the detail enlargement according to the cut out circle XVI in FIG. 16. It illustrated therein that the profile rail 23 forms a shoulder 63 which is used as a displacement stop 64.

FIG. 18 illustrates a sectional view of the locking arrangement 18 according to the sectional line E-E in FIG. 16. From this figure in particular an interaction between the shifting coulisse 52 of the switching block 29 and the control pinion 42 of the pivoting locking bar 27 can be derived. The locking surface 54 configured by the locking block 57 contracts the control pinion 42 and supports the pivoting locking bar 27 in a spring loaded locking position.

FIG. 16 with supplemental FIGS. 17 and 18 illustrates the locking arrangement 18 in an idle position. In this idle position only the forces of the springs 32, 33, 34 define the position of the pivotable locking bar 27 of the switching block 29 and of the locking catches 31. The locking catches 31 are arranged in a displaced position. The pivotable locking bar 27 is spring loaded in the locking position, the switching block 29 is forced into its lower end position. In this lower end position the locking surface 54 supports the pivotable locking bar 27 in its locking position by impacting the control pinion 42. Therefore a lower end position can also be designated as locking position of the switching block 29.

Independently from the illustrated engineering implementation of the invention in the embodiment it is essential that the arresting element 30 is moved out under a spring load into the so called idle position, the locking position, the locking bar element 26 is arranged spring loaded in the locking position and the control arrangement is arranged spring loaded in a first end position, the locking position.

FIG. 13 including the detail enlargement in FIG. 14 and the sectional view in FIG. 15 essentially corresponds to the illustration in FIG. 16. However, the switching block 29 is in its second upper end position. The switching block 29 is moved into its upper end position by the lifting rod 21 which penetrates the lifting rod receiver 58 of the switching block 29 through the lifting rod opening 36 of the pull out profile 16. A linear movement relative to the pull out profile 16 in an upward direction moves the switching block 29 that is supported in a linear movable manner in the pull out profile 16 against an upper contact surface of the profile rail 23 while building up a spring reset force of the control springs 33. Thus, the control coulisse 52 of the switching block 29 cooperates with the control pinion 42 of the pivot able locking bar 27. The control pinions 42 are received by the lifting surface 53 of the switching block 29 wherein a slanted arrangement of the lifting surface relative to the linear movement presses the control pins 42 against the spring force of the control spring 33 in a direction towards an open position of the pivotable locking bar 27 while building up a reset force of the control spring 33. Moving the switching block into its second upper end position, also designated as open position imparts an opening effect from the control coulisse 52 upon the pivotable locking bar 27. In this open position of the switching block 29 the pivotable locking bar 27 is supported by the control coulisse 52 in a defined open position.

Independently from the actual engineering implementation of the embodiment it is essential for the locking arrangement 18 according to the invention that the control arrangement 28 is movable by the lifting rod 21 from its first end position, the locking position into a second end position, the open position. During the movement process of the control arrangement 28 the control arrangement 28 impacts the locking bar element 27 and moves it into its open position. This second end position the open position is supported against the spring forces of the control springs 33 and the locking bar spring 32.

FIG. 10 with its associated FIG. 11, (enlarged detail) and FIG. 12, sectional view corresponds essentially to the representation according to FIGS. 16-18. Thus the switching block 29 however assumes an intermediary position.

In order to move the switching block 29 into the intermediary position illustrated in FIG. 10 the neutral or idle position of the locking arrangement 18 illustrated in FIG. 16 forms a starting point. Non illustrated auxiliary devices which will be described infra move the locking catches 31 in a rotation plane that is oriented parallel to the separation plane of the profile rails 23 and 24 in a direction towards the shifting block 29. The locking catches run above the arresting seat 51 against contacting surfaces of the switching block 29 which stops the rotation movement of the locking catches 31. Now inserting the lifting rod 21 into the lifting rod receiver 58 of the switching block 29 and continued linear movement in upward direction moves the switching block 29 in a direction of a second upper end position. This movement stops when the locking catches 31 come into contact in the arresting seat 51 of the switching block 29. The arresting elements 30 or in the illustrated embodiment the locking catches 31 and their engagement in the arresting seat 51 provides a defined and stable intermediary position of the switching block 29 when moving the lifting rod 21 upward.

Moving the switching block 29 into the stable intermediary position causes a cooperation of the control coulisse 52 of the switching block 29 and the control pinion 42 of the pivotable locking bar 27. The control pinions 42 move into a portion of the movement path 55 formed by the control coulisse 52. As long as the control pinions 42 are arranged in the movement path 55 of the control coulisse 52 by assuming the defined intermediary position of the switching block 29 the pivotable locking bar is freely movable against the spring force of the control spring 33 into the open position and back into the locking position. Thus, the switching block 29 defines a floating position of the pivotable locking bar 27. In this floating position the pivotable locking bar 27 can slide self-acting over an opposite element of the vehicle side support arrangement 19 and can thus be interlocked at the support arrangement 19.

Independently from the actual engineering implementation of the instant embodiment it is only required that the control arrangement 28 can assume a defined or stable intermediary position in which a pivoting of the locking bar element 26 is possible between the locking position and the open position.

Figure 19:
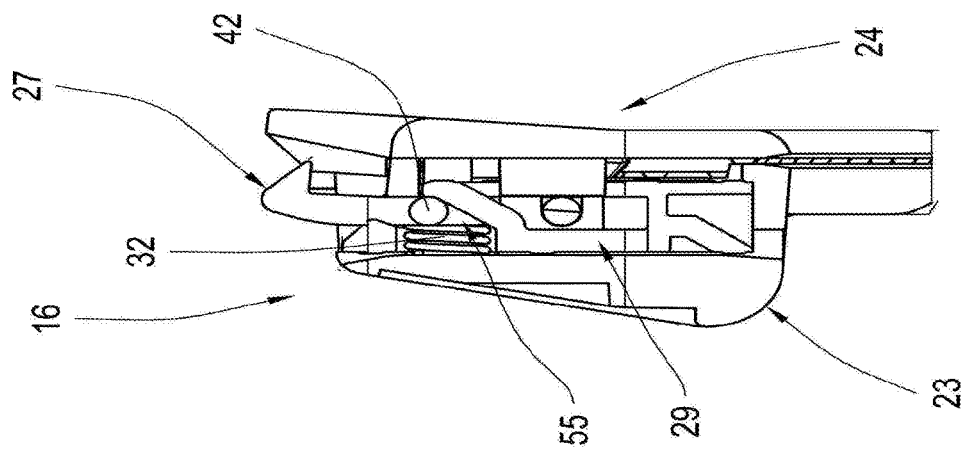
FIGS. 19-21 illustrate sectional views of FIGS. 12, 15 and 18.
Figure 20:
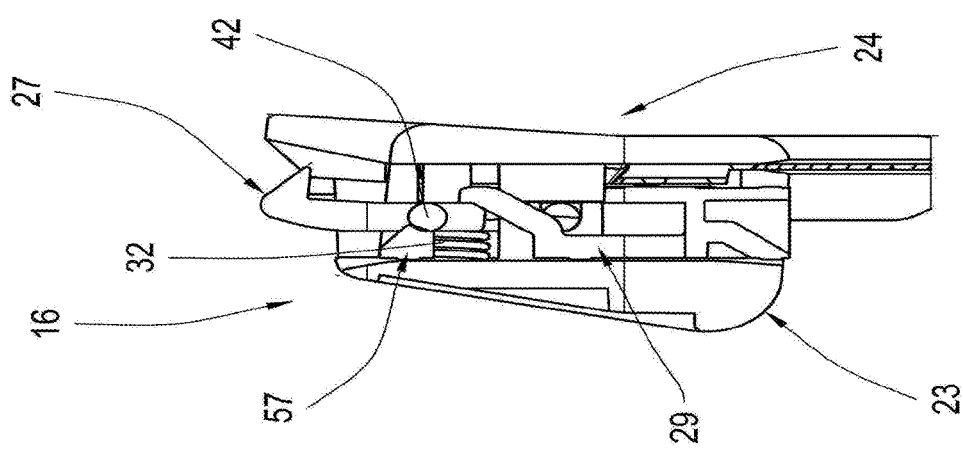
Figure 21:
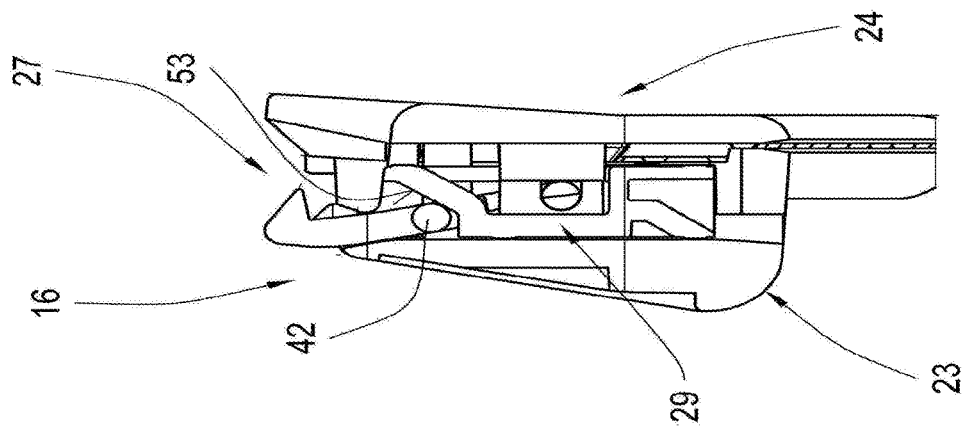

FIGS. 19-21 show sectional views through the pull out profile 16 with different positions of the switching block 29. FIG. 19 corresponds to the sectional view according to FIG. 12. FIG. 20 corresponds to the sectional view according to FIG. 18, FIG. 21 corresponds to the sectional view according to FIG. 15.

Figure 23C:
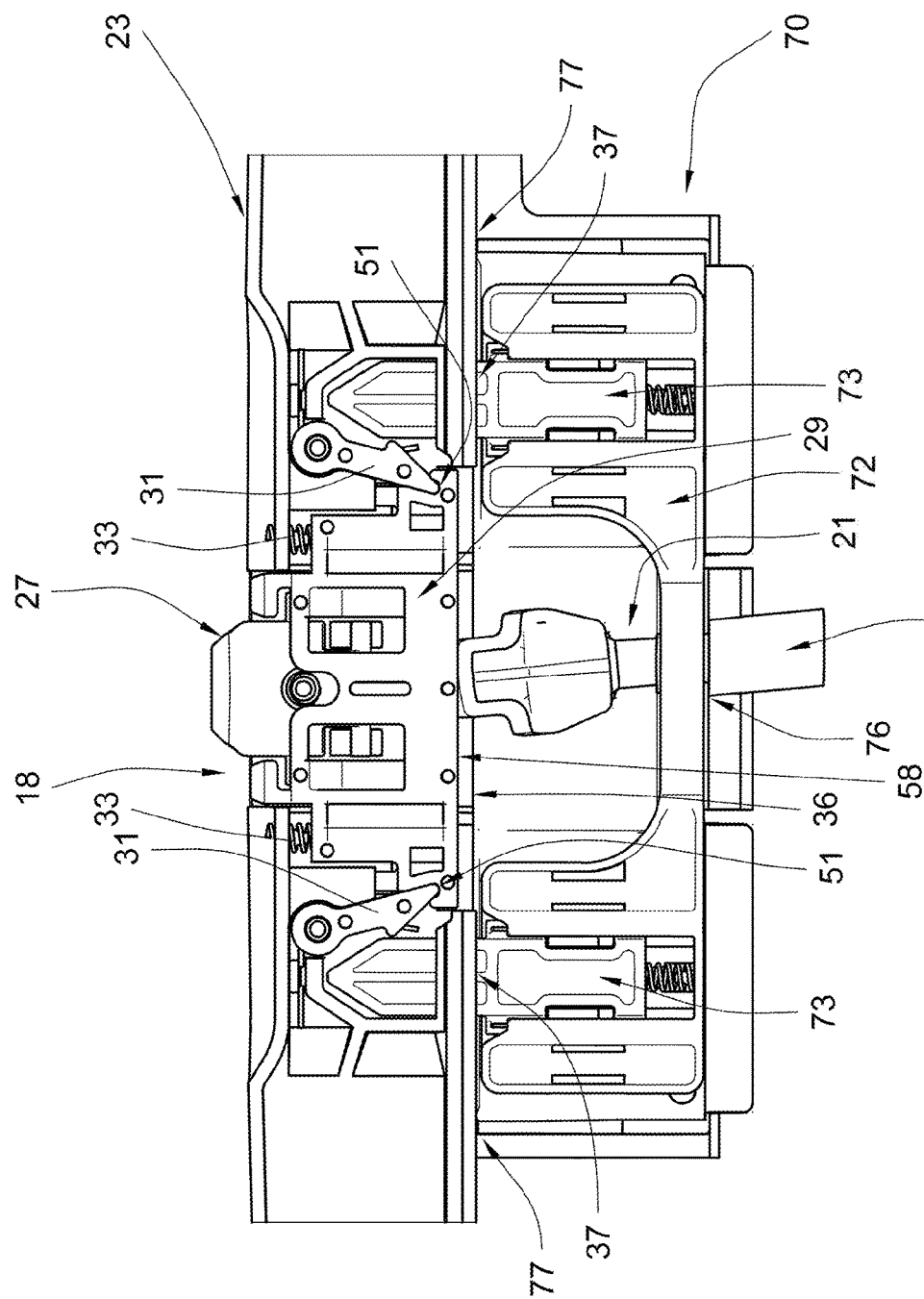

In FIG. 19 the switching block 29 is arranged in its defined intermediary position according to FIG. 10 or 23C. The control pinion 42 is arranged in the portion of the movement path 55 of the control coulisse 52 and is movable against the force of the locking bar spring 32 into its open position. In this switching block position, the intermediary position, the pull out profile 16 is moved in a direction towards the vehicle side support arrangement 19. At this location the pivotable locking bar 27 can be interlocked through an over stroke movement in the open direction behind a corresponding element.

FIG. 20 illustrates the switching block 29 in its first lower end position. The switching block 29 assumes this lower end position after locking in the vehicle side support arrangement 19 as well as in the pulled out position of the roll up blind web 15 when the pull out profile 16 contacts the switching arrangement 70. In this lower end position, also designated as locking position the locking block 57 contacts the control pinion 42 of the pivotable locking bar 27 with its locking surface 54 and retains the pivotable locking bar 27 in its locking position. The locking block 57 prevents a pivoting of the pivotable locking bar 27 into its open position.

In the shade position the locking position of the switching block 29 has the essential advantage that a pivoting of the pivotable locking bar 27 into the open position caused by vibrations is effectively prevented. In the pulled in position the locking bar position provides a vibration free support of the pivotable locking bar 27.

In FIG. 21 the switching block 29 assumes an upper end position, the so called open position. In this open position the switching block is urged by the lifting rod 21 against the reset force of the control springs 33. The lift out surfaces 53 reach behind the control pinions 42 and urge the pivotable locking bar 27 into an open position while building up a reset force of the locking bar spring 32. This position is assumed by the switching block 29 during unlocking from the vehicle side support arrangement 19 in order to return the roll up blind web 15 into its pulled in position. This is illustrated in particular in FIG. 13 in a different view.

Figure 22:
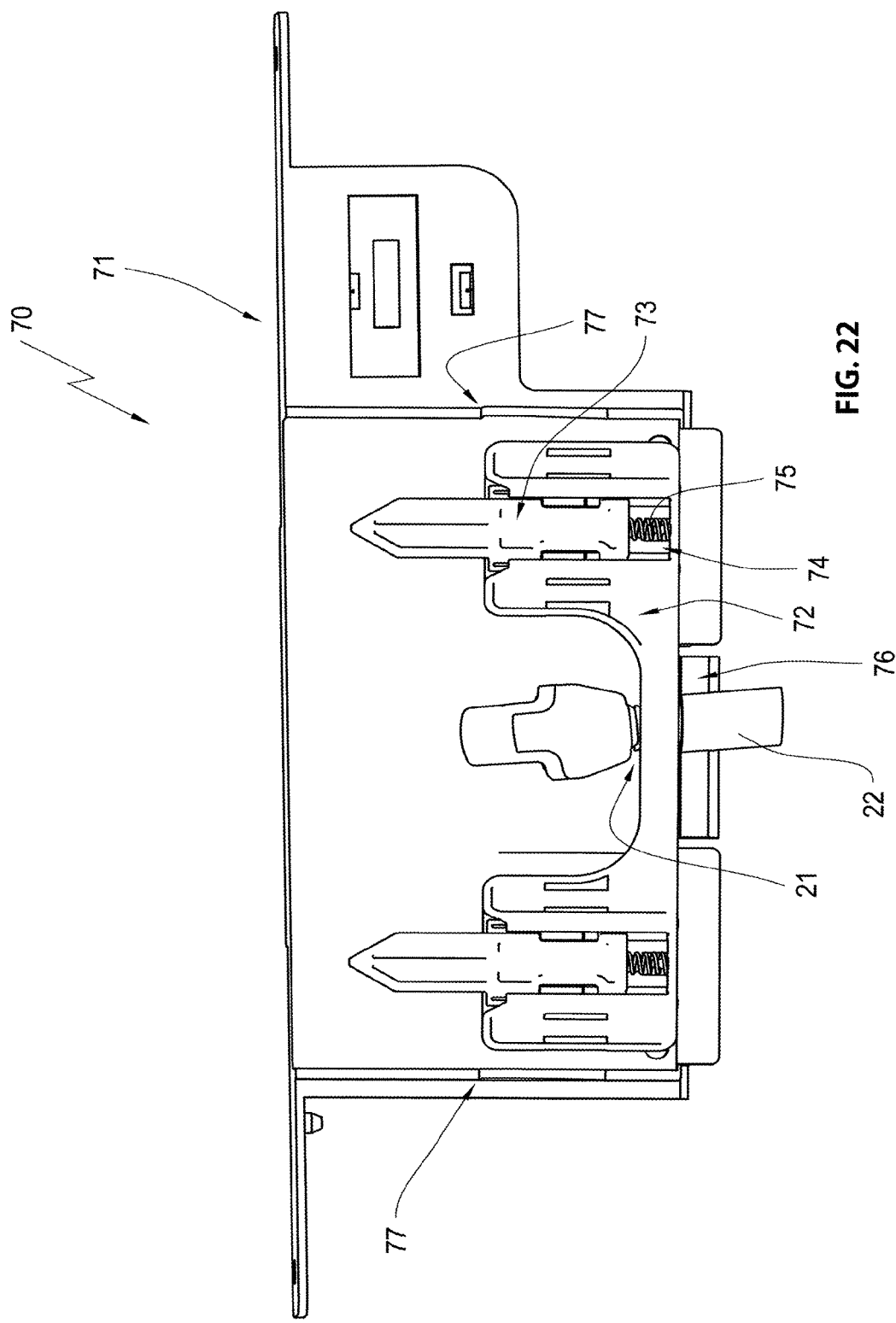
FIG. 22 illustrates a schematic view of the switching arrangement proximal to the winding shaft of the shade arrangement according to FIG. 1.

Thus, a switching arrangement forms a portion of the shade arrangement 10 which is overall designated with the reference numerals 70 and illustrated by itself in FIG. 22.

The switching arrangement 70 includes a switching housing 71 in which a switching slider 72 is received. The switching slider 72 is supported transversally movable relative to the linear movement of the lifting rod 21 and includes two switching pins 73 that are oriented parallel to each other. The switching pins 73 are supported in pin recesses 74 of the switching slider 72 and can be moved up and down in respective pin recesses 74 parallel to the linear movement of the lifting rod 21. Between a base of each pin recess 74 and the switching pin 73 itself a switching pin spring 75 is supported. The switching pin spring urges the respectively associated switching pin 73 in upward direction against a movement end stop formed by the switching slider 72. Last not least the switching arrangement 70 includes a pass through 76 for the lifting rod 21 and a contact shoulder 77 on which the pull out profile 16 is supportable.

The switching arrangement 70 cooperates with the locking arrangement 18 in that it influences in particular the arresting elements 30 configured as locking catches 31 with respect to their positions. The switching arrangement 70 is arranged in a portion of the lower window edge of the side door 11 and thus proximal to the winding shaft. When the roll up blind web is wound on the winding shaft 14, the section of the pull out profile 16 supporting the locking arrangement 18 is supported on the contact shoulder 77 of the switching arrangement. The interaction between the switching arrangement device 70 and the locking arrangement 18 in cooperation with the lifting rod 21 is now described with reference to FIGS. 23a-26.

FIG. 23a illustrates the so called starting position of a cooperation of the switching arrangement 70 and the interlocking arrangement 18. The switching block 29 is in its lower end position, the lifting rod 21 is decoupled from the pull out profile 16 or from the switching block 29. Thus, there is no impact of the lifting rod 21 upon the switching block 29. The pull out profile 16 of which only the profile rail 23 is illustrated sits on contact shoulders 77 of the switching arrangement 70. The switching pins 73 penetrate through the switching openings 37 of the pullout profile 16 and thus move into a movement space of the locking catches 31. Through a suitable slanted surface pairing between the locking catch and the associated switching pin 73 the locking catch 31 is urged by the shift pin 73 in a direction towards the switching block 29 at its contact surfaces above the arresting seat 51. Thus, the arresting springs 34 build up a reset force that counteracts the movement in the direction of the switching block 29. The pivotable locking bar 27 is arrested in its locking position due to the position of the switching block 29. Thus, reference is made to the sectional view according to FIG. 18.

The arrangement illustrated in FIG. 23A is assumed by the shade arrangement 10 when the roll up blind web 15 is supported in the pulled in position. Arresting the pivotable locking bar 27 in the locking position prevents a locking bar movement by impulses which can be generated by the suspension for example of a car for example on an uneven running surface and thus prevents rattling noises. Also the lifting rod 21 is safely supported against rattling. This can be facilitated among other things by a cooperation of conical surfaces of a lifting rod tip and a corresponding opening shape and opening width of the lifting rod pass through 76.

The condition of the locking arrangement 18 illustrated in FIG. 23C differs only slightly from the representation in FIG. 23A. The electric motor drive 20 has moved the lifting rod 21 in upward direction, thereafter the lifting rod 21 was able to penetrate through the lifting rod 26 of the pull out profile 16 into the lifting rod receiver 58 of the switching block 29. A continued upward movement of the lifting rod 21 lifts the switching block 29 until the locking catches 31 engage the arresting seat 51. This way the switching block 29 is moved from its lower end position, the locking position into a defined intermediary position. The pivotable locking bar 27 is now freely movable in its floating position and movable from its locking position against the spring force of the locking spring into its open position and by the locking spring 32 back again into its locking position. The sectional view according to FIG. 12 illustrates the control connection between the switching block 29 and the pivot able locking bar 27.

A continued extension movement of the lifting rod 21 in a direction towards the upper window edge of the side door 11 disengages the pull out profile 16 of which FIG. 23C only illustrates a first profile rail 23 from the switching arrangement 70, wherein the defined intermediary position of the switching block 29 is maintained due to the locking catches 31 that are supported in the arresting seats 51. When reaching the vehicle door side support arrangement 19 the pivotable locking bar 27 will slide past a cooperating locking bar arrangement and will thus perform an over stroke movement in the open position plus a return movement due to the built up reset force of the blocking bar spring 32. The pivotable locking bar 27 is then arranged in the locking position and then anchored in the support arrangement 19 of the vehicle door 11.

A return movement of the lifting rod 21 into its starting position causes the control springs 33 to move the switching block 29 back into its lower end position, the blocking position. Thus, the locking blocks 57 are moved with their locking surfaces 54 behind the control pins 42 of the pivotable locking bar 27 so that the pivotable locking bar 27 is arrested in its locking position. In so far reference is made to the sectional view according to FIG. 18. The locking arrangement 18 now has the condition illustrated in FIG. 16. In this position of the shift block 29 moving the pivotable locking bar 27 back into the open position is not possible. Therefore the locking position is also safely maintained under considerable vibrations of the vehicle.

In order to move the roll up blind web 15 back from its shade position into its pulled in position the lifting rod 21 is initially deployed in an upward direction towards the retaining arrangement 19. The lifting rod penetrates the lifting rod opening 36 of the pull out profile 16 and penetrates the lifting rod receiver 58 of the switching block 29. A further upward oriented linear movement of the lifting rod 21 moves the switching block 29 into its second upper end position, the open position due to a lacking engagement of the locking catches 31. This movement is performed while building up a reset force of the control springs 33. The upward movement of the switching block 29 has a controlling influence through the control coulisse 52 upon the pivotable locking bar 27. The lift out surfaces 53 of the control coulisse 52 engage the control pin 42 of the pivotable locking bar 27 and force it against the force of the locking spring 32 into the open position. Thus, the interlocking with the support arrangement 19 of the side door 11 is disengaged. The locking arrangement 18 of the pull out profile 16 is now arranged in the position illustrated in FIGS. 13 and 15.

The lifting rod 21 now moves back downward, wherein the roll up shade web 15 is rolled by the winding shaft drive onto the winding shaft 14. Thus, the pull out profile 16 is run into the pull in direction and supported on the lifting rod 21. Since the return force of the winding shaft motor is greater than the return force of the control springs 33 the switching block 29 remains in its upper position.

Figure 24A:
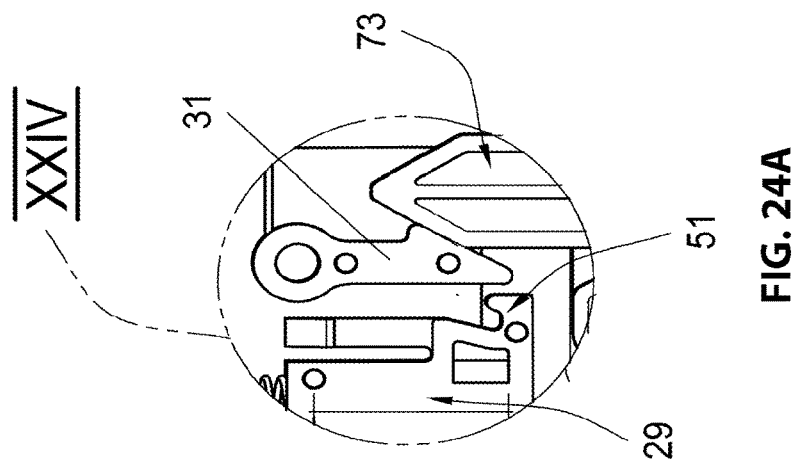
Figure 24:
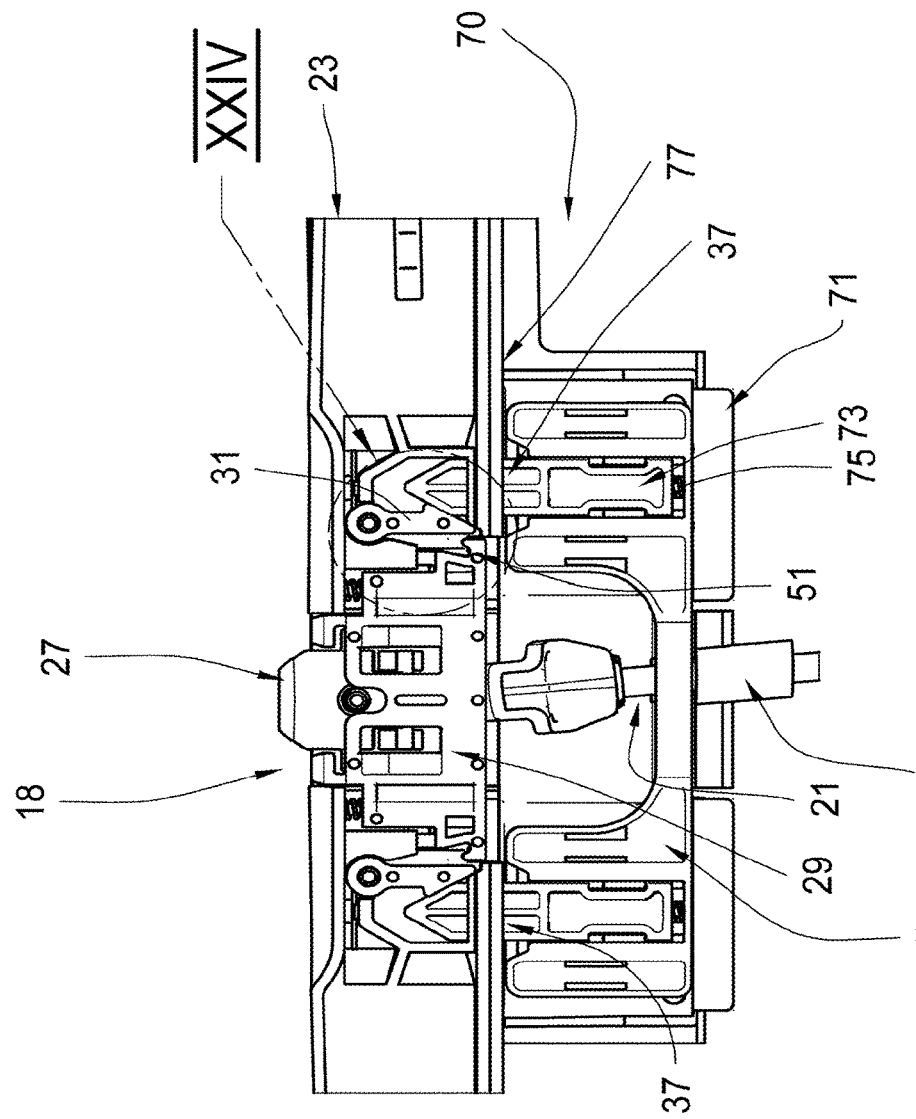
Figure 26A:
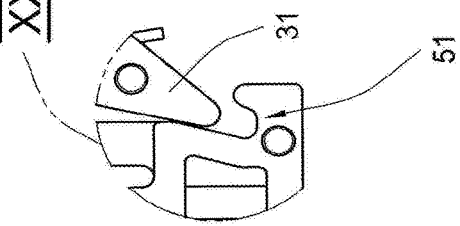
Figure 26:
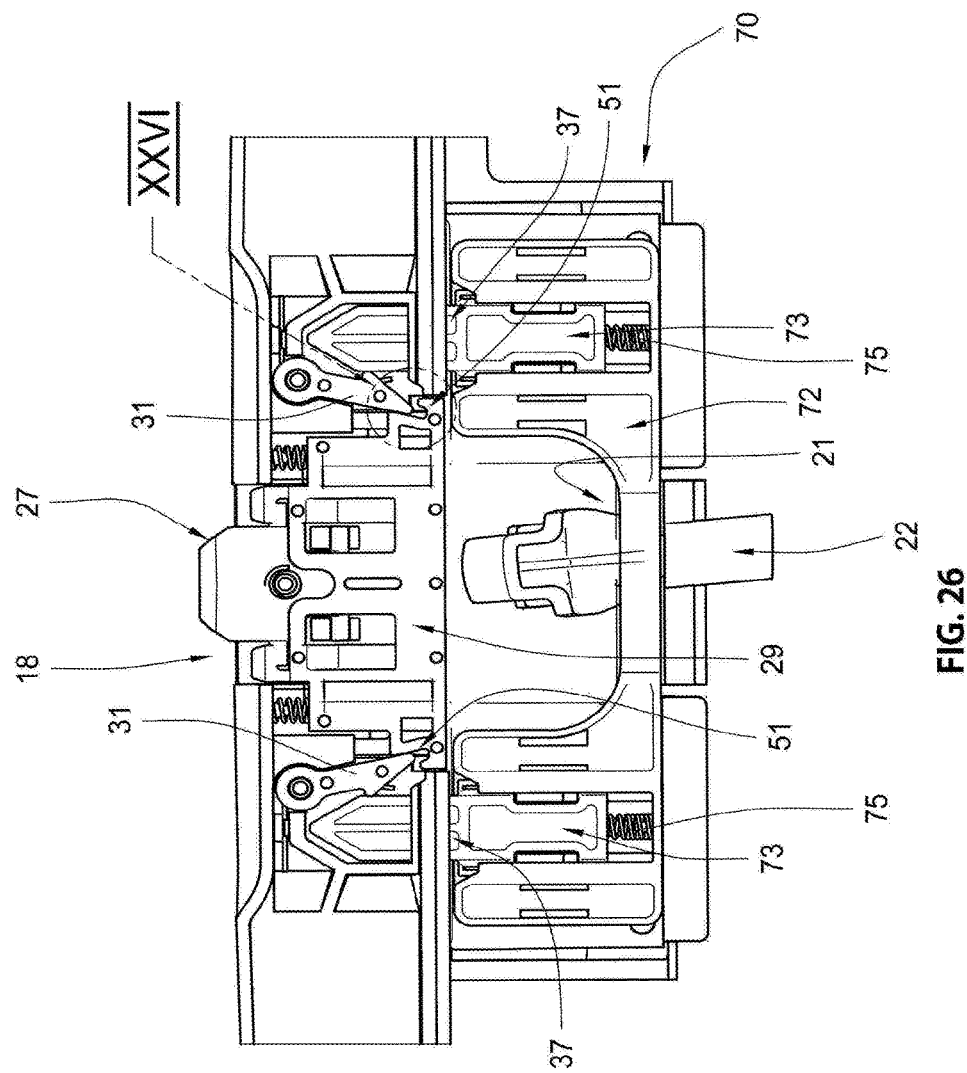

In this end position the switching block impacts the switching arrangement 70 wherein the pull in movement of the roll up blind web 15 is terminated as soon as the pull out profile 16 contacts the contact shoulder 77 of the switching arrangement 70. The switching pins 73 penetrate through the switching openings 37 of the pull out profile 16 into the movement path of the arresting elements configured as locking catch 31, wherein the slanted surfaces of the locking catch 31 and the switch pin 73 impact each other. The pairing of the contact surfaces leads to a displacement of the locking catches 31 in a direction towards the switching block 29. Since the switching block 29 is still in its upper end position the catching blocks 31 contact the switching block 29 laterally from the arresting seat 51. The displacement movement induced by the switching pins 73, however, cannot be completed. Consequently the arresting elements 30 configured as locking catch 31 displace the switch pins 73 downward into the switch pin recesses 74 wherein the switch pin recesses 75 are compressed and build up a reset force. This condition is illustrated in FIG. 24.

The continued reset movement of the lifting rod 21 in downward direction leads to a decoupling from the switching block 29 so that the control springs 33 urge the switching block 29 into its end position. This is illustrated in FIG. 25.

Now the movement space for the locking catches 31 is clear. The reset forces of the switch pin springs 75 cause a deployment of the switch pins 73 in upward direction into the movement path of the locking catches 31 and urge the locking catches into a portion above the arresting seats 51 of the switching block 29. The locking arrangement 18 is arranged again in the starting position already described in FIG. 23a.

Independently from the particular engineering implementation of the embodiment described supra it is essential for the invention that the control arrangement 28 can be brought into a defined intermediary position by arresting elements 30. For this purpose a switching arrangement 70 is used which moves the arresting elements 30 into an end position or an arresting position. This facilitates to impart the defined intermediary position upon the control arrangement 30 by moving the lifting rod 21 in the upward direction.

In order to be able to compensate for tolerances between a theoretical ideal position and a real position caused by external influences the lifting rod receiver 58 is fabricated with a certain oversize. Additionally slanted surfaces are provided on both sides of the lifting rod 21 and of the lifting rod receiver 58 wherein the slanted surfaces safely introduce the lifting rod 21 into the lifting rod receiver 58 in mutual cooperation. Also the switching openings 37 can be fabricated with a certain oversize. Additionally it was recited supra that the switching slider 72 is horizontally movable. As evident from the drawing figures the switching pins 73 include slanted surfaces. The slanted surfaces are not only useable for controlling the locking catches 31. The slanted surfaces move the switch pins 73 towards the switching openings together with the horizontal movability of the slider 72.

In order to provide the different switching positions of the control arrangement 28 the return force of the roll up blind web 15 generated by the first drive or the winding shaft motor is greater than the spring force of the control springs 33. The spring reset forces of the control springs 33 are in turn greater than the spring forces of the switch pin springs 75. The spring forces of the arresting springs 34 are less than the spring forces of the switch pin springs 75. This layered force system provides a safe control for the control unit 28. The implemented force system facilitates using the shade arrangement 10 independent from its position. The linear movement of the lifting rod does not have to be provided vertically, it can also be performed horizontally. The movement from the pulled in position into the shade position can also be performed top down.

In this respect the invention is not limited to a window cut out 12 at a side door 11 but can also be used for rear windows or for shading moon roofs. The invention is also suitable for cargo space divider nets or for controlling cargo space covers.

Another embodiment of the invention has the object of making the control of the locking arrangement supporting the pull out profile in the vehicle side support arrangement more variable in order to increase options for influencing the same.

The object is achieved by a shade arrangement with the feature group 1 described infra.

In the known art the lifting rod engages the pull out profile as a matter of principle. Since the lifting rod due to engagement of the pull out profile, in case of a separate control arrangement is provided, imparts uninterrupted control the decoupling of pull out profile and lift rod provides an influencing of the control arrangement that is independent from the lifting rod.

The additional embodiment thus provides that a switching arrangement is provided which interacts with the control device for the interlocking in addition to the lifting rod, in particular when the switching arrangement operates during a decoupling of the lifting rod from the pull out profile.

The additional switching arrangement which impacts the control arrangement independently from the lifting rod facilitates providing control alternatives. The control alternatives facilitate substantially improving the function of the locking arrangement.

Thus, it is possible that the switching arrangement urges at least one arresting element into an arresting position in which the arresting element supports the control arrangement in a defined position.

It is conceivable for example by the arresting elements controlled by the switching arrangement to define the control position of the control arrangement which cannot be obtained by the lifting rod by itself.

The additional shifting arrangement is advantageously supported in a receiver, wherein the receiver is provided for the section of the pull out profile within which the control arrangement is arranged. The switching arrangement then forms part of the receiver.

The receiver is arranged at locations of the vehicle where the shade arrangement in particular the pull out profile assumes one of its end positions. This is either the pulled in position or the shade position. Then the receiver with its switching arrangement would be arranged so that the switching arrangement is inserted in the receiver when the pull out profile is in the shade position. However it is advantageously provided that the receiver with its switching arrangement is arranged so that the pull out profile sits in the receiver in its pulled in position.

It is provided that the switching arrangement includes a switching pin which urges the arresting element in its arresting position in a switching position of the switching pin in particular when the control arrangement is urged by a spring force of the control spring into an end position receiving the arresting element when the lifting rod is decoupled.

It is furthermore provided that the arresting element is spring loaded against its arresting position by an arresting spring.

This embodiment also provides that the switching pin is spring loaded by a switching spring in a direction towards its switching position.

In a particularly advantageous embodiment it is provided that the spring force of the control spring is greater than the spring force of the switching spring and the spring force of the switching spring is greater than the spring force of the arresting spring.

Further advantages and a better comprehension of this embodiment can be derived from the preceding depiction with reference to the drawing figures.

This additional embodiment is now described with reference to feature groups.

A shade arrangement for vehicles, in particular for a side window of a car door, the shade arrangement comprising:

a roll up blind web that is movable from a pulled in position into a shading pulled out position;

a winding shaft at which the roll up blind web is attached with a first edge;

a pull out profile at which the roll up blind web is attached with a second edge;

a first drive which actuates the winding shaft for rolling up the roll up blind web;

a lifting rod which is removably attachable at the pull out profile;

a second drive through which the lifting rod arranged at the pull out profile moves the roll up blind web by a linear movement between the pulled in position and the pulled out position;

a locking arrangement that is associated with the pull out profile wherein the locking arrangement is configured to attach the pull out profile in a support arrangement at a retaining device at the vehicle;

a first control arrangement which cooperates with the locking arrangement and with the lifting rod to unlock or to lock the locking arrangement in the pulled out position of the roll up blind web, characterized in that the lifting rod is disconnectable from the pullout profile in the pulled in position of the roll up blind web and movable into a disconnected position.

2. The shade arrangement according to feature group 1, characterized in that a switching arrangement is provided which cooperates with the control arrangement for the interlocking in addition to the lifting rod.

3. The shade arrangement according to feature group 2, characterized in that the switching arrangement operates when there is a decoupling between the lifting rod and the pull out profile.

4. The shade arrangement according to feature group 2 or 3, characterized in that the switching arrangement urges at least one arresting element into an arresting position into which the arresting element supports the control arrangement in a defined position.

5. The shade arrangement according to one of the feature groups 2 through 4, characterized in that a receiver is provided for a section of the pull out profile, wherein the control arrangement is arranged within the section of the pull out profile and the switching arrangement forms part of the receiver.

6. The shade arrangement according to feature group 2, characterized in that the switching arrangement includes a switching pin which urges the arresting element into an arresting position in a switching position of the switching pin.

7. The shade arrangement according to features group 4, characterized in that the control arrangement is urged spring loaded into an end position receiving the arresting element when the lifting rod is decoupled, wherein the spring loading is controlled by a control spring, 8. The shade arrangement according to feature group 4, characterized in that the arresting element is spring loaded by an arresting spring against an arresting position of the arresting element.

9. The shade arrangement according to feature group 6, characterized in that the switching pin is spring loaded by a switching spring in a direction towards a switching position of the switching pin.

10. The shade arrangement according to feature groups 7 through 9, characterized in that a spring force of the control spring is greater than a spring force of the switching spring and the spring force of the switching spring is greater than a spring force of the arresting spring.

REFERENCE NUMERALS AND DESIGNATIONS 10 shade arrangement
11 side door 12 window cut out
13 window frame
14 winding shaft
15 roll up blind web
16 pull out profile
17 winding shaft housing
18 locking arrangement
19 support arrangement
20 electric motor drive
21 lifting rod
22 support tube
23 first profile rail
24 second profile rail
25 receiving chamber
26 locking bar element
27 pivotable locking bar
28 control arrangement
29 switching block
30 arresting element
31 locking catch
32 locking bar spring
33 control spring
34 arresting spring
35 locking bar opening
36 lifting rod opening
37 switching opening
38 centering pin
39 cut out
40 locking bar axis
41 body
42 control pinion
43 locking bar lug
44 annular shoulder
45 locking bar cavity
46 rear wall
47 locking bar spring pull in
48 control spring receiving cavity
49 support hook
50 support protrusion of 23/24
51 arresting seat
52 control coulisse
53 lifting surface
54 blocking surface
55 movement cavity
57 locking block
58 lifting rod receiver
59 support mandrel
60 bearing shell
61 support mandrel
62 leg spring arm
63 shoulder
64 displacement stop
70 switching arrangement
71 switching housing
72 switching slider
73 switching pin
74 pin recess
75 switching pin spring
76 lifting rod pass through
77 contact shoulder

What is claimed is:

1. A shade arrangement for vehicles, the shade arrangement comprising:
a roll up blind web that is movable from a pulled in position into a shading pulled out position;
a winding shaft at which the roll up blind web is attached with a first edge;
a first drive which actuates the winding shaft for rolling up the roll up blind web;
a lifting rod which is removably attachable at the pull out profile;
a second drive through which the lifting rod arranged at the pull out profile moves the roll up blind web in a linear motion between the pulled in position and the pulled out position;
a locking arrangement that is arranged in the pull out profile wherein the locking arrangement is configured to attach the pull out profile in a support arrangement at the vehicle; and
a receiving chamber formed by the pull out profile wherein a control arrangement and the locking arrangement is arranged in the receiving chamber and wherein the control arrangement is configured to influence a position of the locking arrangement,
wherein the control arrangement cooperates with the locking arrangement to unlock the locking arrangement in the pulled out position of the roll up blind web,
wherein the control arrangement is supported movable in a linear manner in the receiving chamber to assume control positions between a first end position and a second end position,
wherein a first control position of the control arrangement is assumed in the first end position and a second control position of the control arrangement is assumed in the second end position,
wherein the locking arrangement cooperates with the lifting rod to lock or unlock the locking arrangement in the pulled out position of the roll up blind web,
wherein the control arrangement includes a third control position of the control arrangement, and
wherein the third control position of the control arrangement is an intermediary position between the first control position of the control arrangement and the second control position of the control arrangement.

2. A shade arrangement for vehicles, the shade arrangement comprising:
a roll up blind web that is movable from a pulled in position into a shading pulled out position;
a winding shaft at which the roll up blind web is attached with a first edge;
pull out profile at which the roll up blind web is attached with a second edge;
a first drive which actuates the winding shaft for rolling up the roll up blind web;
a lifting rod which is removably attachable at the pull out profile;
a second drive through which the lifting rod arranged at the pull out profile moves the roll up blind web in a linear motion between the pulled in position and the pulled out position;
a locking arrangement that is arranged in the pull out profile wherein the locking arrangement is configured to attach the pull out profile in a support arrangement at the vehicle; and
a control arrangement which cooperates with the locking arrangement and with the lifting rod to unlock or to lock the locking arrangement in the pulled out position of the roll up blind web,
wherein the pull out profile forms a receiving chamber in which the control arrangement is arranged in addition to the locking arrangement, and
wherein the control arrangement is configured to influence a position of the locking arrangement, and wherein the control arrangement is supported movable in a linear manner between a first end position and a second end position to move into control positions within the receiving chamber.

3. The shade arrangement according to claim 2, wherein a first control position of the control arrangement is provided in the first end position and a second control position of the control arrangement is provided in the second end position.

4. The shade arrangement according to one of the claim 3, wherein a third control position of the control arrangement is provided.

5. The shade arrangement according to claim 4, wherein the third control position of the control arrangement is provided in an intermediary position that is defined between the first end position and the second end position.

6. The shade arrangement according to claim 5,
wherein at least one arresting element is arranged within the receiving chamber, and
wherein the at least one arresting element supports the control arrangement in the third position of the control arrangement.

7. The shade arrangement according to claim 2, wherein the locking arrangement includes a locking bar and a locking bar spring that loads the locking bar in a locking direction.

8. The shade arrangement according to claim 3, wherein the control arrangement is supported by a control spring in the first end position or the second end position.

9. The shade arrangement according to claim 6, wherein the arresting element is loaded by an arresting spring.

10. A shade arrangement for vehicles, the shade arrangement comprising:

a roll up blind web that is movable from a pulled in position into a shading pulled out position;
a winding shaft at which the roll up blind web is attached with a first edge;
a pull out profile at which the roll up blind web is attached with a second edge;
a first drive which actuates the winding shaft for rolling up the roll up blind web:
a lifting rod which is removably attachable at the pull out profile;
a second drive through which the lifting rod arranged at the pull out profile moves the roll up blind web in a linear motion between the pulled in position and the pulled out position:
a locking arrangement that is arranged in the pull out profile wherein the locking arrangement is configured to attach the pull out profile in a support arrangement at the vehicle; and
a control arrangement which cooperates with the locking arrangement and with the lifting rod to unlock or to lock the locking arrangement in the pulled out position of the roll up blind web,
wherein the pull out profile forms a receiving chamber in which the control arrangement is arranged in addition to the locking arrangement, and
wherein the control arrangement is configured to influence a position of the locking arrangement, and
wherein the control arrangement forms a receiver for the lifting rod.

* * * * *